(12) United States Patent
Kato et al.

(10) Patent No.: US 11,533,430 B2
(45) Date of Patent: Dec. 20, 2022

(54) IMAGE CAPTURING DEVICE WITH DISPLAY CONTROL, IMAGE COMMUNICATION SYSTEM, AND METHOD FOR DISPLAY CONTROL, AND RECORDING MEDIUM

(71) Applicants: Yoshinaga Kato, Kanagawa (JP); Naoki Tsunoda, Tokyo (JP); Ryoh Fukui, Kanagawa (JP)

(72) Inventors: Yoshinaga Kato, Kanagawa (JP); Naoki Tsunoda, Tokyo (JP); Ryoh Fukui, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/103,977

(22) Filed: Nov. 25, 2020

(65) Prior Publication Data
US 2021/0168285 A1  Jun. 3, 2021

(30) Foreign Application Priority Data

Nov. 29, 2019 (JP) .............................. JP2019-216518
Sep. 29, 2020 (JP) .............................. JP2020-162981
Nov. 18, 2020 (JP) .............................. JP2020-191841

(51) Int. Cl.
*H04N 5/247* (2006.01)
*H04N 5/00* (2011.01)
*H04N 5/232* (2006.01)

(52) U.S. Cl.
CPC ......... *H04N 5/23238* (2013.01); *H04N 5/247* (2013.01); *H04N 5/23293* (2013.01)

(58) Field of Classification Search
None
See application file for complete search history.

(56) References Cited

U.S. PATENT DOCUMENTS

| | | | |
|---|---|---|---|
| 2010/0231717 A1* | 9/2010 | Sasaki | G06T 7/80 348/148 |
| 2013/0265436 A1* | 10/2013 | Rehn | H04N 5/23216 348/159 |
| 2014/0354683 A1* | 12/2014 | Suzuki | G06T 19/006 345/632 |
| 2016/0277679 A1* | 9/2016 | Kimura | H04N 5/23216 |
| 2017/0206417 A1* | 7/2017 | Aoyama | G06K 9/00255 |
| 2017/0347035 A1* | 11/2017 | Kim | H04N 5/23296 |
| 2018/0182065 A1 | 6/2018 | Yoshida et al. | |

(Continued)

FOREIGN PATENT DOCUMENTS

| | | |
|---|---|---|
| JP | 2011-082917 | 4/2011 |
| JP | 2018-110384 | 7/2018 |

(Continued)

OTHER PUBLICATIONS

Extended European Search Report dated Apr. 21, 2021 in European Patent Application No. 20209426.4, 10 pages.

*Primary Examiner* — Edemio Navas, Jr.
(74) *Attorney, Agent, or Firm* — Xsensus LLP

(57) ABSTRACT

An image capturing device includes an imaging device to capture a first image, and circuitry to receive a second image from another image capturing device, the second image having an angle of view wider than that of the first image, and control a display to sequentially display the first image and the second image.

15 Claims, 22 Drawing Sheets

(56) References Cited

U.S. PATENT DOCUMENTS

| | | |
|---|---|---|
| 2018/0184001 A1 | 6/2018 | Yoshida et al. |
| 2018/0270417 A1 | 9/2018 | Suitoh et al. |
| 2019/0222737 A1* | 7/2019 | Aoyama ............ A61B 1/00009 |
| 2020/0280669 A1* | 9/2020 | Kawaguchi ............... G06T 5/50 |
| 2020/0288083 A1 | 9/2020 | Toda et al. |
| 2020/0304751 A1 | 9/2020 | Katoh et al. |

FOREIGN PATENT DOCUMENTS

| | | |
|---|---|---|
| JP | 2018-169601 | 11/2018 |
| JP | 2019-140568 | 8/2019 |
| WO | 2019/082925 A1 | 5/2019 |

\* cited by examiner

HEMISPHERICAL IMAGE (FRONT)

HEMISPHERICAL IMAGE (BACK)

EQUIRECTANGULAR PROJECTION IMAGE EC (WIDE-ANGLE VIEW IMAGE)

FIG. 4B
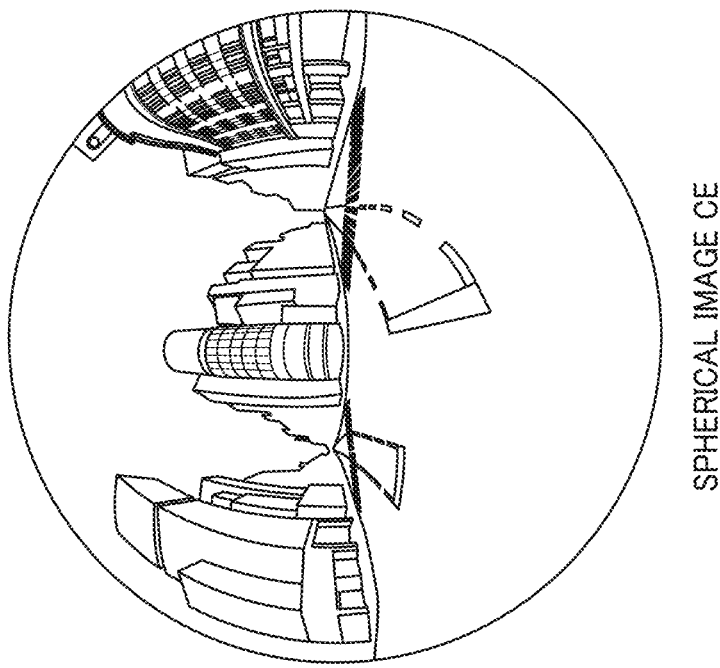
SPHERICAL IMAGE CE
FIG. 4A
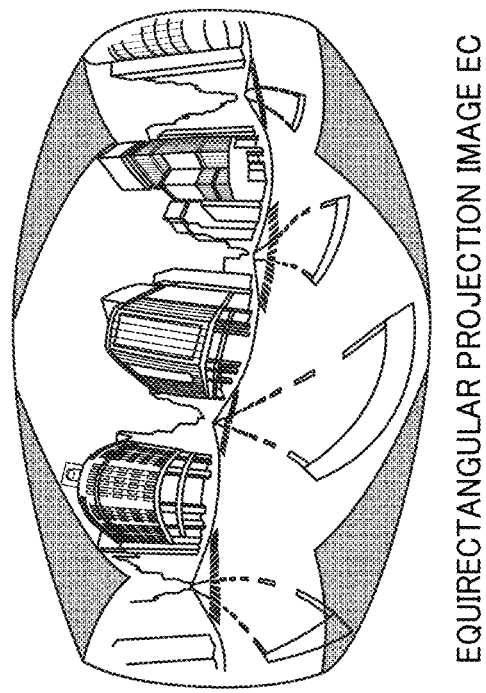
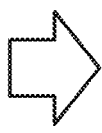
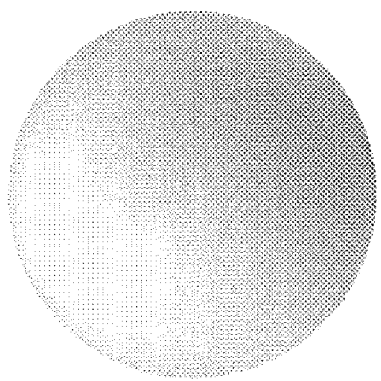
EQUIRECTANGULAR PROJECTION IMAGE EC
(WIDE-ANGLE VIEW IMAGE)

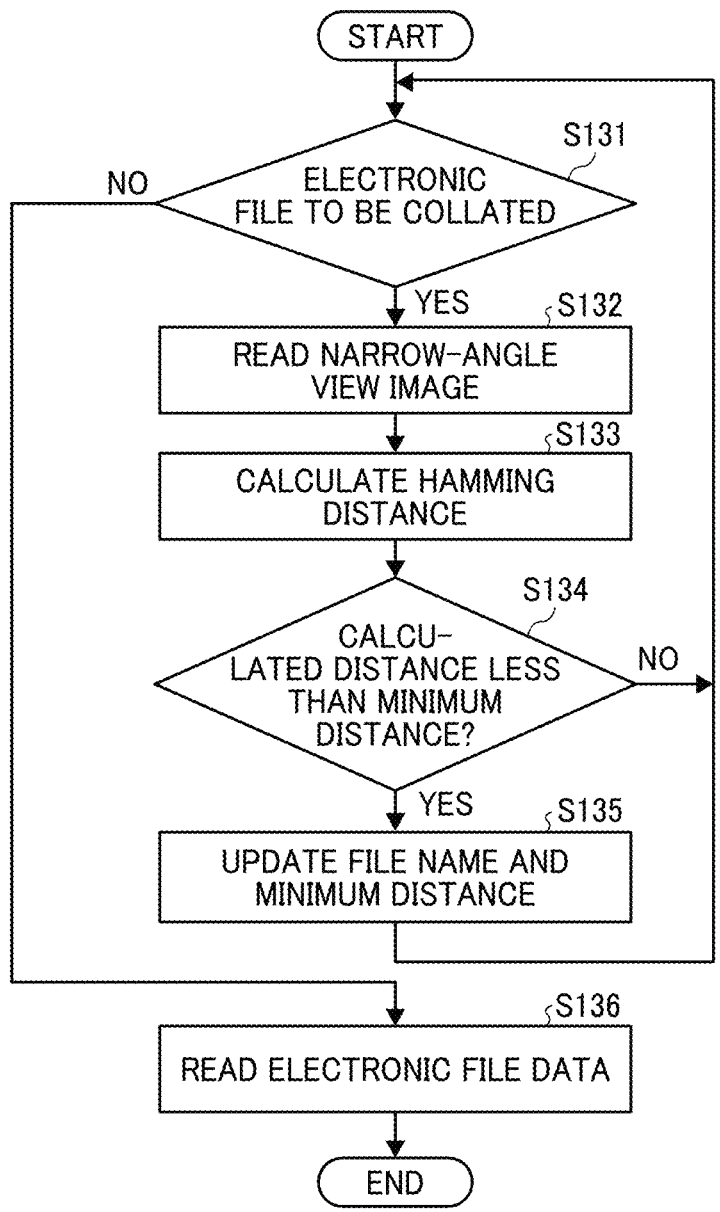

IMAGE CAPTURING DEVICE WITH DISPLAY CONTROL, IMAGE COMMUNICATION SYSTEM, AND METHOD FOR DISPLAY CONTROL, AND RECORDING MEDIUM

CROSS-REFERENCE TO RELATED APPLICATIONS

This patent application is based on and claims priority pursuant to 35 U.S.C. § 119(a) to Japanese Patent Application Nos. 2019-216518, filed on Nov. 29, 2019, 2020-162981, filed on Sep. 29, 2020, and 2020-191841, filed on Nov. 18, 2020, in the Japan Patent Office, the entire disclosure of which is hereby incorporated by reference herein.

BACKGROUND

Technical Field

The present invention relates to an image capturing device, image communication system, method for display control, and recording medium.

Discussion of the Background Art

Recently, there is a need for displaying a wide-angle view image with an image capturing device capable of displaying an image as a narrow-angle view image. For example, a wide-angle view image, such as an equirectangular projection image, may be captured with a wide-angle view image capturing device such as a spherical (360-degree) image capturing device. The captured wide-angle view image may be then displayed using a narrow-angle view image capturing device, such as a smart phone.

However, even though the wide-angle view image can be taken, the narrow-angle view image capturing device can only display a limited portion of the wide-angle view image, as the narrow-angle view image. By just looking at an object in the narrow-angle view image, it has been difficult for a viewer to recall a place where the image was taken or situation under which the image was taken.

SUMMARY

Example embodiments include an image capturing device including an imaging device to capture a first image, and circuitry to receive a second image from another image capturing device, the second image having an angle of view wider than that of the first image, and control a display to sequentially display the first image and the second image.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4A and FIG. 4B are views respectively illustrating the image in equirectangular projection covering a surface of a sphere, and a spherical image, according to embodiments;

FIG. 22 is a flowchart illustrating collation processing on the narrow-angle view image data, according to the second embodiment.

Figure 1:
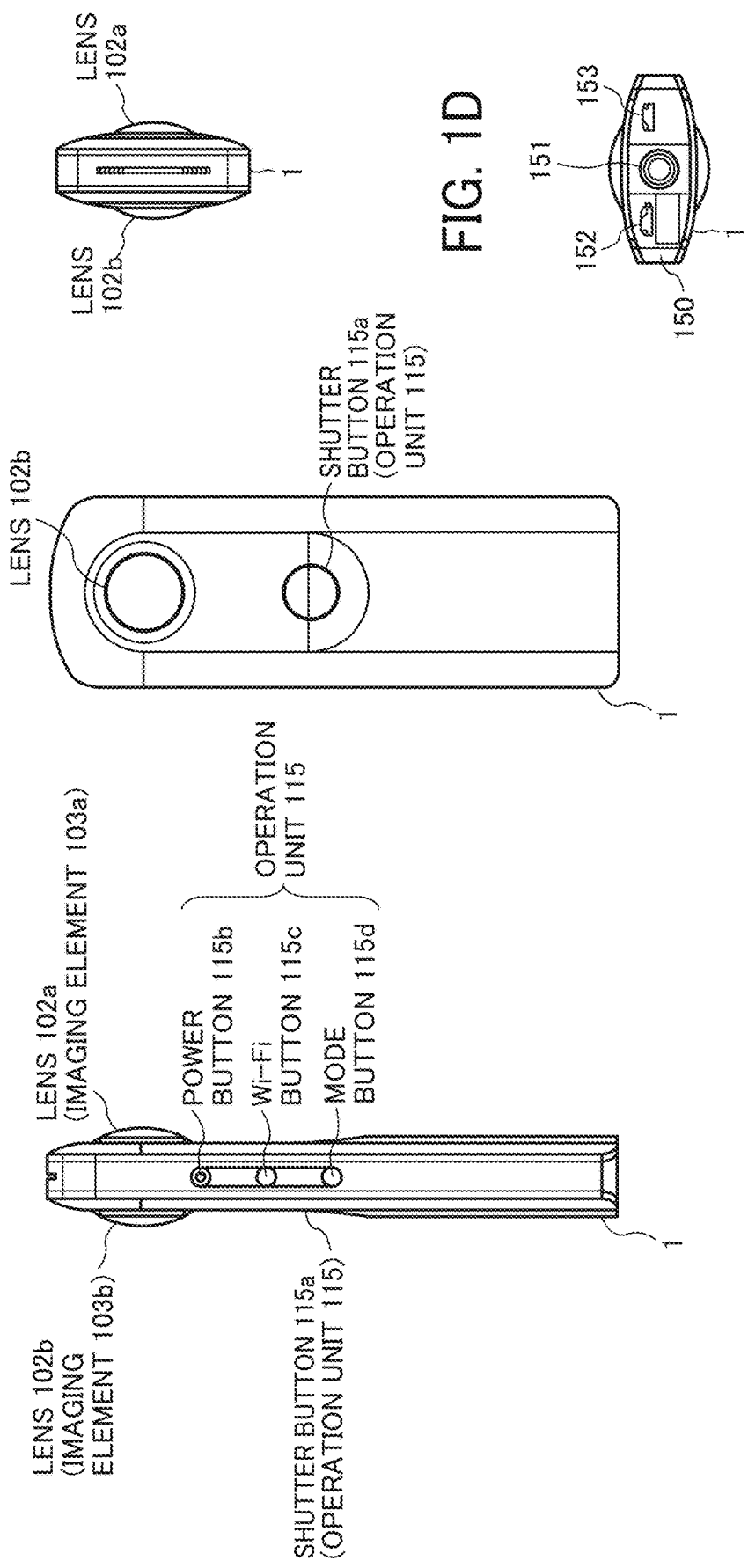
FIGS. 1A to 1D (FIG. 1) are respectively a right side view, a rear view, a plan view, and a bottom view of a spherical image capturing device, according to embodiments.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Overview

Embodiments of the present invention are described below, with reference to the drawings.

First, referring to FIGS. 1 to 7, operation of generating a spherical image is described according to one or more embodiments.

First, referring to FIGS. 1A to 1D, an external view of a spherical image capturing device 1, is described. The spherical image capturing device 1 is a digital camera for capturing images from which a 360-degree spherical image is generated. FIGS. 1A to 1D are respectively a left side view, a rear view, a plan view, and a bottom view of the spherical image capturing device 1.

As illustrated in FIGS. 1A to 1D, the spherical image capturing device 1 has an upper part, which is provided with a fish-eye lens 102a on a front side (anterior side) thereof, and a fish-eye lens 102b on a back side (rear side) thereof. The spherical image capturing device 1 includes imaging elements (imaging sensors) 103a and 103b in its inside. The imaging elements 103a and 103b respectively capture images of an object or surroundings via the lenses 102a and 102b, to each obtain a hemispherical image (the image with an angle of view of 180 degrees or greater). As illustrated in FIG. 1B, the spherical image capturing device 1 further includes a shutter button 115a on a rear side of the spherical image capturing device 1, which is opposite of the front side of the spherical image capturing device 1. As illustrated in FIG. 1A, one side of the spherical image capturing device 1 is provided with a power button 115b, a Wireless Fidelity (Wi-Fi) button 115c, and an image capturing mode button 115d. Any one of the power button 115b and the Wi-Fi button 115c switches between ON and OFF, according to selection (pressing) by the user. The image capturing mode button 115d switches between a still-image capturing mode and a moving image capturing mode, according to selection (pressing) by the user. The shutter button 115a, power button 115b, Wi-Fi button 115c, and image capturing mode button 115d are a part of an operation unit 115. The operation unit 115 is any section that receives a user instruction, and is not limited to the above-described buttons or switches.

As illustrated in FIG. 1D, the spherical image capturing device 1 is provided with a tripod mount hole 151 at a center of its bottom face 150. The tripod mount hole 151 receives a screw of a tripod, when the spherical image capturing device 1 is mounted on the tripod. The bottom face 150 of the spherical image capturing device 1 further includes a Micro Universal Serial Bus (Micro USB) terminal 152, on its left side. The bottom face 150 further includes a High-Definition Multimedia Interface (HDMI, Registered Trademark) terminal 153, on its right side.

Figure 2:
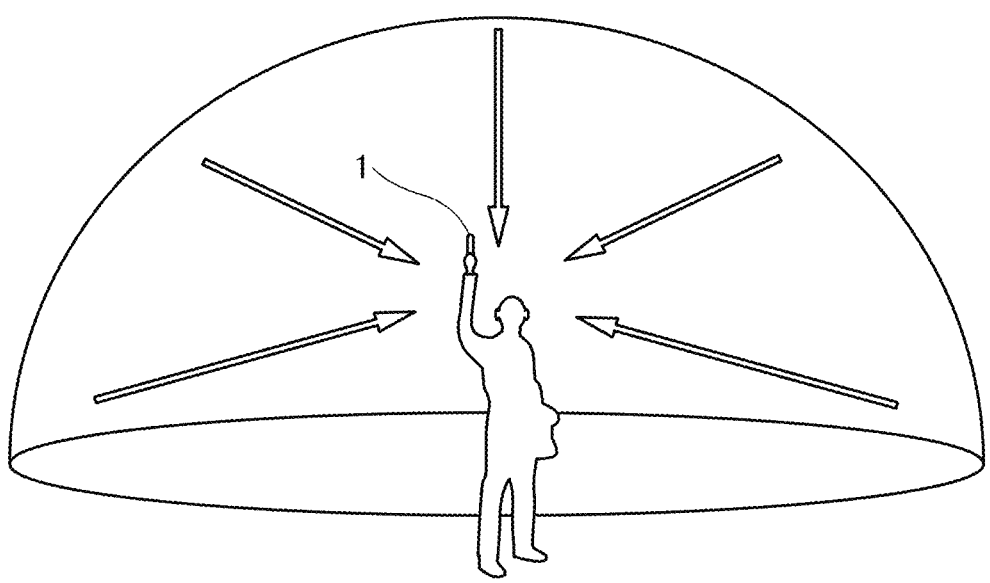
FIG. 2 is an illustration for explaining how a user uses the spherical image capturing device, according to embodiments.

Next, referring to FIG. 2, a description is given of a situation where the spherical image capturing device 1 is used. FIG. 2 illustrates an example of how the user uses the spherical image capturing device 1. As illustrated in FIG. 2, for example, the spherical image capturing device 1 is used for capturing objects surrounding the user who is holding the spherical image capturing device 1 in his or her hand. The imaging elements 103a and 103b illustrated in FIGS. 1A to 1D capture the objects surrounding the user to obtain two hemispherical images.

Figure 3A:
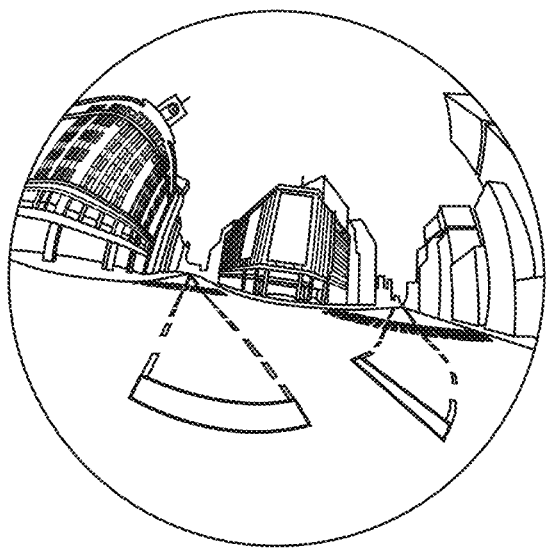
FIGS. 3A, 3B, and 3C (FIG. 3) are views illustrating a front side of a hemispherical image, a back side of the hemispherical image, and an image in equirectangular projection, respectively, captured by the spherical image capturing device, according to embodiments.
Figure 3B:
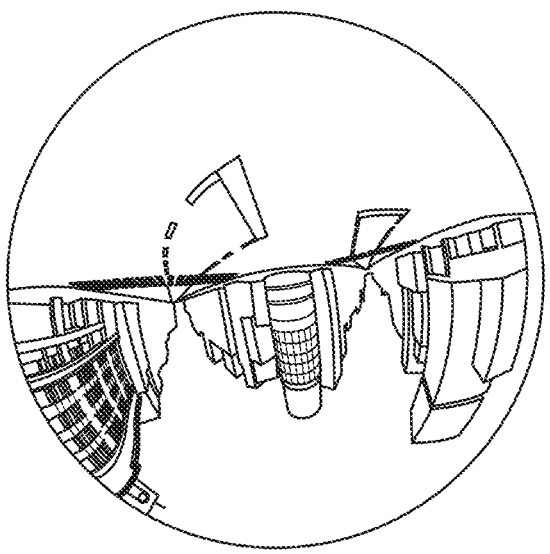
Figure 3C:
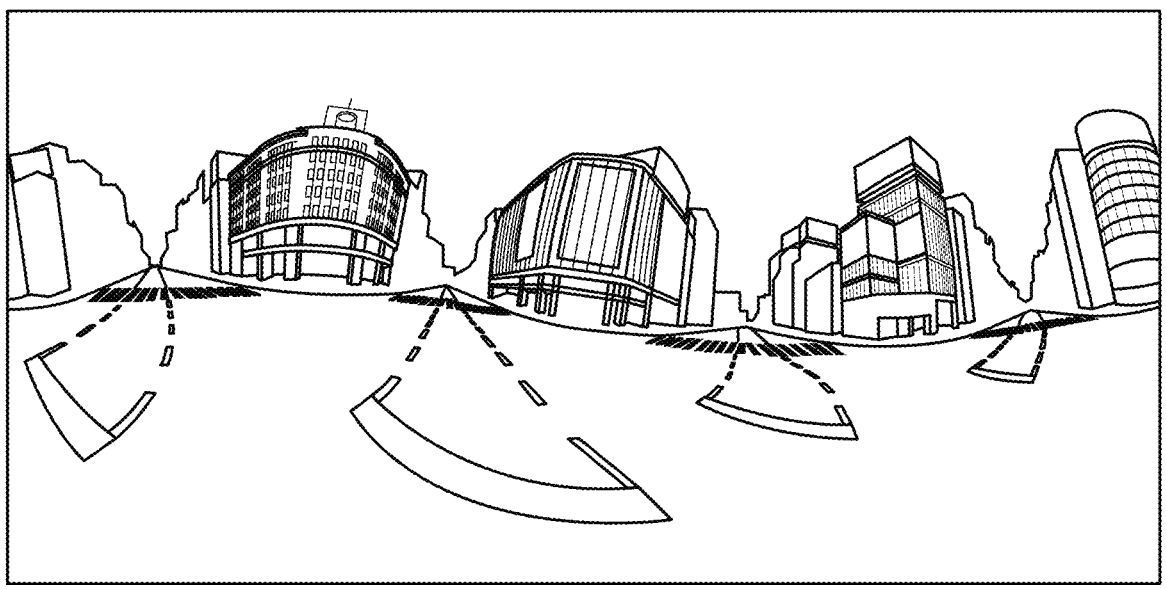

Next, referring to FIGS. 3A to 3C and FIGS. 4A and 4B, a description is given of an overview of an operation of generating an equirectangular projection image EC and a spherical image CE from the images captured by the spherical image capturing device 1. FIG. 3A is a view illustrating a hemispherical image (front side) captured by the spherical image capturing device 1. FIG. 3B is a view illustrating a hemispherical image (back side) captured by the spherical image capturing device 1. FIG. 3C is a view illustrating an image in equirectangular projection, which is referred to as an "equirectangular projection image" (or equidistant cylindrical projection image) EC. FIG. 4A is a conceptual diagram illustrating an example of how the equirectangular projection image maps to a surface of a sphere. FIG. 4B is a view illustrating the spherical image.

As illustrated in FIG. 3A, an image captured by the imaging element 103a is a curved hemispherical image (front side) taken through the fish-eye lens 102a. Also, as illustrated in FIG. 3B, an image captured by the imaging element 103b is a curved hemispherical image (back side) taken through the fish-eye lens 102b. The hemispherical image (front side) and the hemispherical image (back side), which are reversed by 180-degree from each other, are combined by the spherical image capturing device 1. This results in generation of the equirectangular projection image EC as illustrated in FIG. 3C.

The equirectangular projection image is mapped on the sphere surface using Open Graphics Library for Embedded Systems (OpenGL ES) as illustrated in FIG. 4A. This results in generation of the spherical image CE as illustrated in FIG. 4B. In other words, the spherical image CE is represented as the equirectangular projection image EC, which corresponds to a surface facing a center of the sphere CS. It should be noted that OpenGL ES is a graphic library used for visualizing two-dimensional (2D) and three-dimensional (3D) data. The spherical image CE is either a still image or a moving image. Further, although the above-described example illustrates a case in which an equirectangular projection image is mapped on a three-dimensional sphere CS, the equirectangular projection image may be mapped on a cube or a prism.

Figure 5:
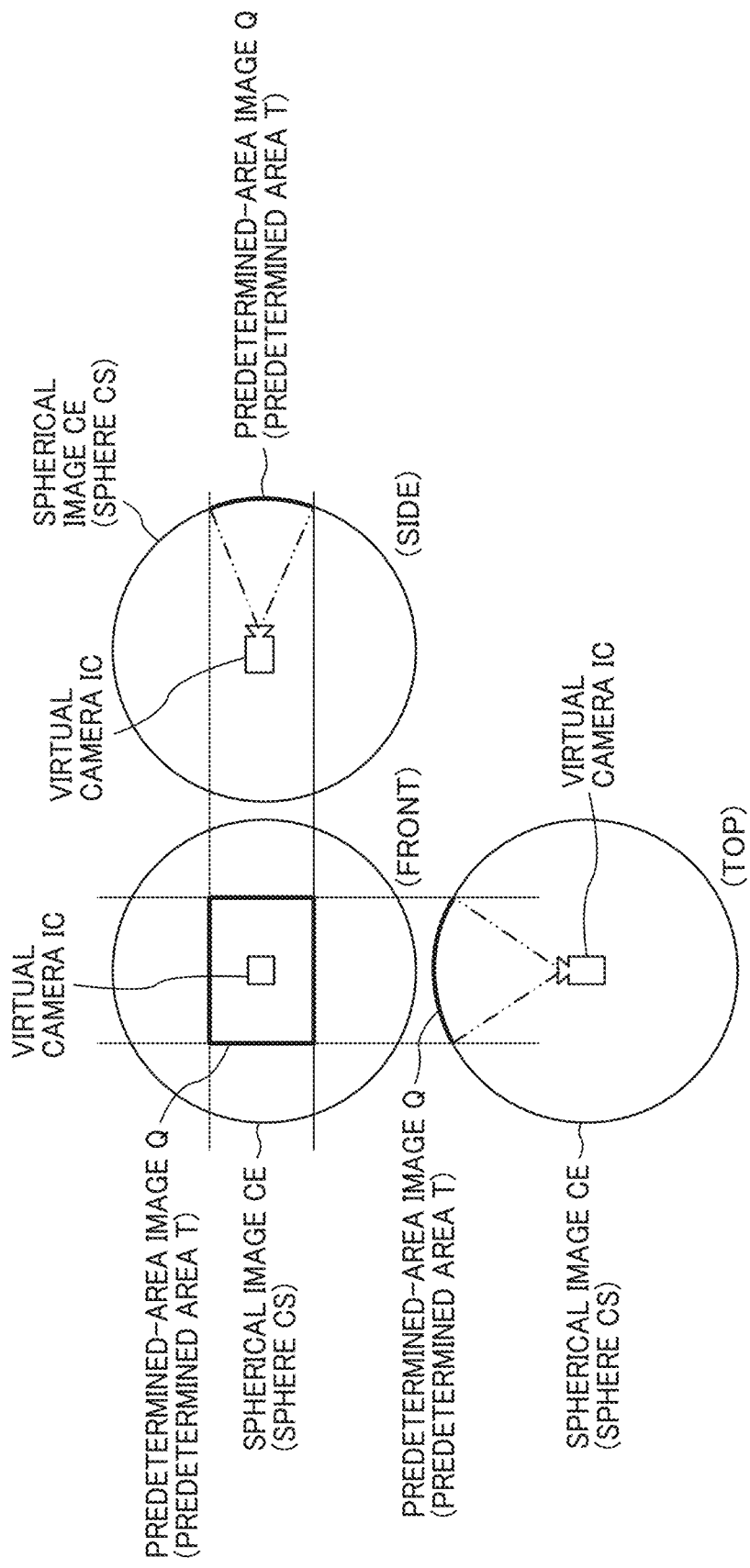
FIG. 5 is a view illustrating positions of a virtual camera and a predetermined area in a case in which the spherical image is represented as a three-dimensional solid sphere according to embodiments.

Since the spherical image CE is an image attached to the sphere surface, as illustrated in FIG. 5B, a part of the image may look distorted when viewed from the user, providing a feeling of strangeness. To resolve this strange feeling, an image of a predetermined area, which is a part of the spherical image CE, is displayed as a flat image having fewer curves. The predetermined area is, for example, an area of the spherical image CE that is displayed to the user, when the spherical image is displayed via a display. While the term "predetermined" is used, the predetermined area may be changed according to user operation. For example, as described referring to FIG. 7, the predetermined area that is firstly displayed is at least set according to information on the vertical camera IC. Hereinafter, a description is given of displaying the predetermined-area image Q with reference to FIG. 5 and FIGS. 6A and 6B.

Figure 6A:
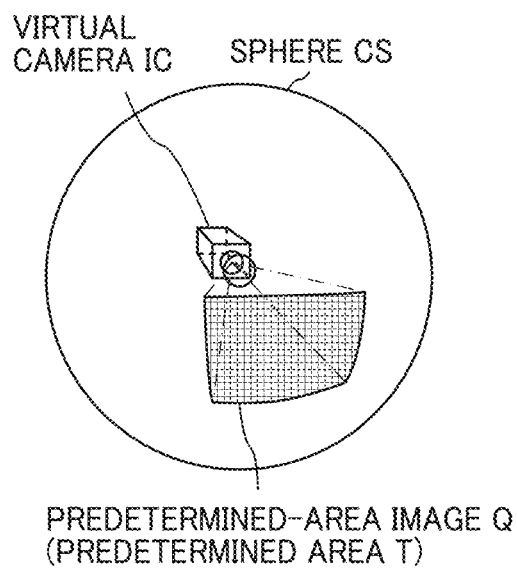
FIGS. 6A and 6B are respectively a perspective view of FIG. 5, and a view illustrating an image of the predetermined area on a display, according to embodiments.
Figure 6B:
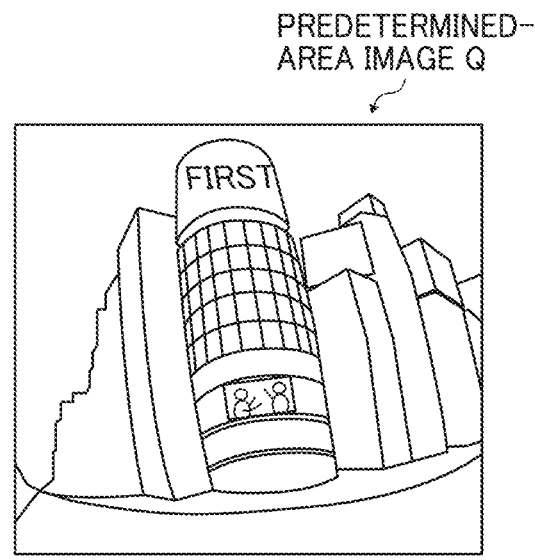

FIG. 5 is a view illustrating positions of a virtual camera IC and a predetermined area T in a case in which the spherical image is represented as a surface area of a three-dimensional solid sphere. The virtual camera IC corresponds to a position of a point of view (viewpoint) of a user who is viewing the spherical image CE represented as a surface area of the three-dimensional solid sphere CS. FIG. 6A is a perspective view of the spherical image CE illustrated in FIG. 5. FIG. 6B is a view illustrating the predetermined-area image Q when displayed on a display. In FIG. 6A, the spherical image CE illustrated in FIG. 4B is represented as being mapped on the three-dimensional solid sphere CS. Assuming that the spherical image CE is mapped on the solid sphere CS, the virtual camera IC is inside of the spherical image CE as illustrated in FIG. 5. The predetermined area T in the spherical image CE is an imaging area of the virtual camera IC. Specifically, the predetermined area T is specified by predetermined-area information indicating an imaging direction and an angle of view of the virtual camera IC in a three-dimensional virtual space containing the spherical image CE.

The predetermined-area image Q, which is an image of the predetermined area T illustrated in FIG. 6A, is displayed on a display as an image of an imaging area of the virtual camera IC, as illustrated in FIG. 6B. FIG. 6B illustrates the predetermined-area image Q represented by the predetermined-area information that is set by default. The following explains the position of the virtual camera IC, using an imaging direction (θ, φ) and an angle of view α of the virtual camera IC. The imaging direction is also referred to as a line-of-sight direction of the user.

Figure 7:
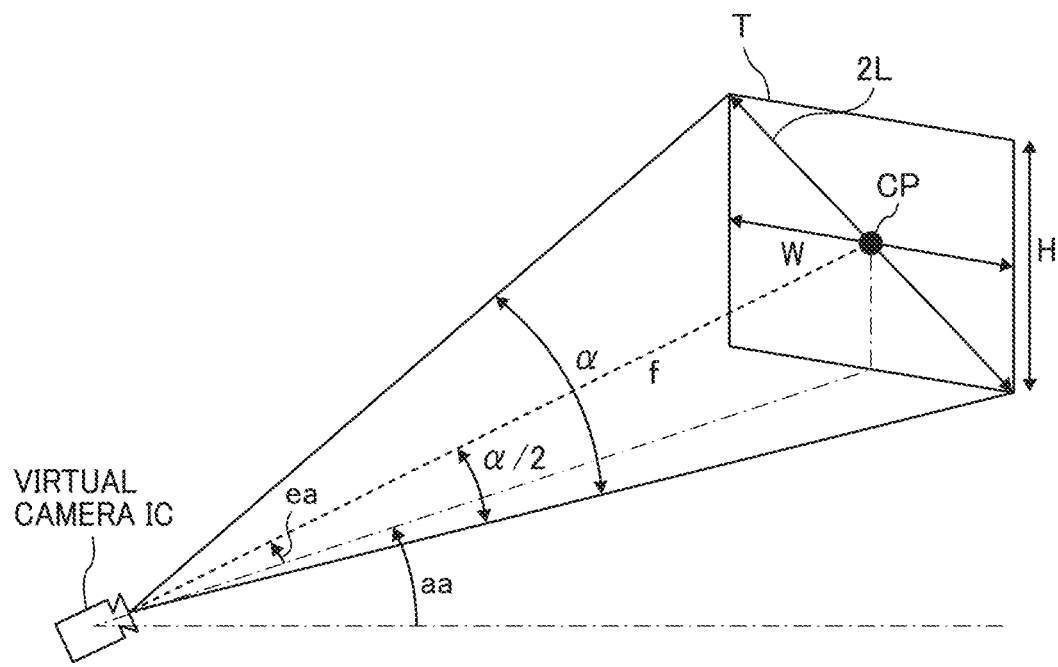
FIG. 7 is a view illustrating a relation between predetermined-area information and a predetermined-area image according to embodiments.

Referring to FIG. 7, a relation between the predetermined-area information and the image of the predetermined area T is described according to the embodiment. FIG. 7 is a view illustrating a relation between the predetermined-area information and the image of the predetermined area T. As illustrated in FIG. 7, "θ" denotes a pan angle in the imaging direction of the virtual camera IC, "φ" denotes a tilt angle in the imaging direction of the virtual camera IC, and "α" denotes an angle of view. Further, "W" denotes a width of the predetermined area T, and "H" denotes a height of the predetermined area T. The position of the virtual camera IC is adjusted, such that the point of gaze of the virtual camera IC, indicated by the imaging direction (θ, φ), matches the central point CP of the predetermined area T as the imaging area of the virtual camera IC. The predetermined-area image Q is an image of the predetermined area T, in the spherical image CE. "f" denotes a distance from the virtual camera IC to the central point CP of the predetermined area T. "L" is a distance between the center point CP and a given vertex of the predetermined area T (2L is a diagonal line). In FIG. 7, a trigonometric function equation generally expressed by the following equation 1 is satisfied.

$$L/f=\tan(\alpha/2) \quad \text{(Equation 1)}$$

First Embodiment

Referring now to FIGS. 8 to 17, an image capturing system is described according to a first embodiment.

Schematic Configuration of Image Communication System

Figure 8:
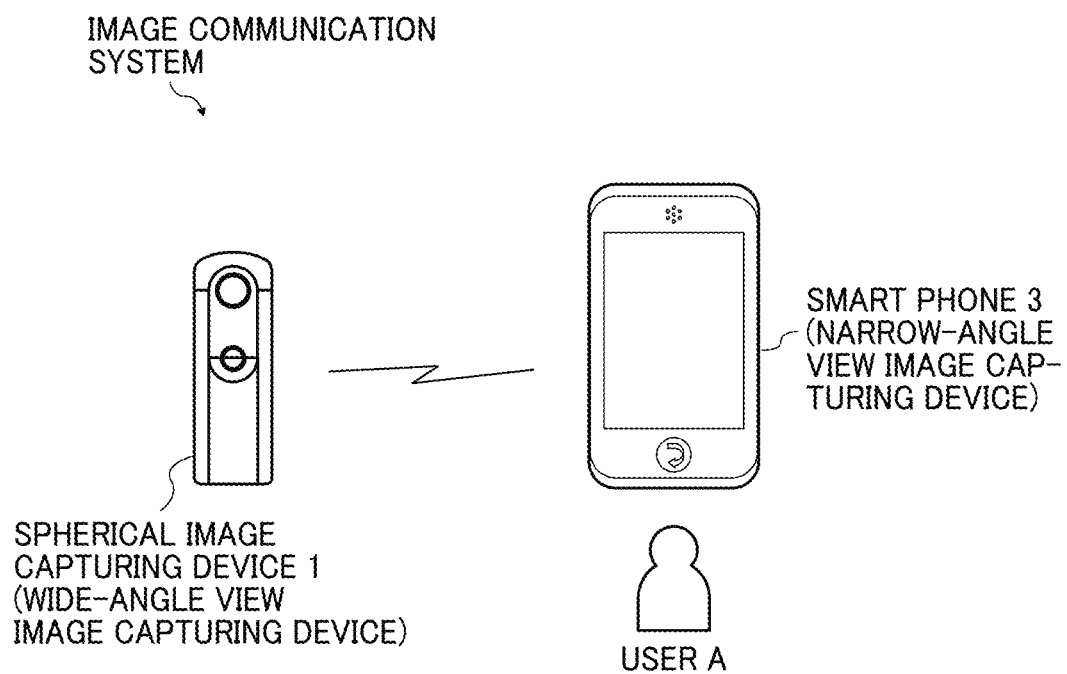
FIG. 8 is a schematic diagram illustrating a configuration of an image communication system according to a first embodiment.

First, referring to FIG. 8, an overview of the image communication system is described according to the first embodiment. FIG. 8 is a schematic diagram illustrating a configuration of the image communication system according to the first embodiment.

As illustrated in FIG. 8, the image communication system includes the spherical image capturing device 1, and a smart phone 3. The spherical image capturing device 1 and the smart phone 3 are wirelessly communicable with each other using short-range wireless communication, such as Wi-Fi, BLUETOOTH, and Near Field Communication (NFC). The spherical image capturing device 1 and the smart phone 3 may communicate with each other without using the short-range wireless communication, but using wired communication such as a Universal Serial Bus (USB) cable.

The spherical image capturing device 1 is a special digital camera, which captures an image of an object or surroundings such as scenery to obtain two hemispherical images, from which an equirectangular projection image is generated, as described above referring to FIGS. 1 to 7. The spherical image capturing device 1 is an example of a wide-angle view image capturing device. Examples of the wide-angle view image capturing device also include, but not limited to, an image capturing device (single-lens reflex camera, compact digital camera, smart phone, tablet PC, etc.) capable of capturing a planar image (2D panoramic image, etc.) having a wide-angle view. In the present embodiment, the case in which the spherical image capturing device 1, such as a digital camera for capturing an equirectangular projection image, is used.

The equirectangular projection image is an example of a wide-angle view image. Examples of the wide-angle view image include, in addition to the equirectangular projection image, the above-mentioned planar image of a wide-angle view. Here, the wide-angle view image is generally an image taken with a wide-angle lens, such as a lens capable of taking a range wider than a range that the human eye can perceive. Further, the wide-angle view image is generally an image taken with a lens having a focal length of 35 mm or less in terms of 35 mm film.

The smart phone 3 is a mobile phone used by the user A, which is provided with a mobile Operating System (OS). The smart phone 3 is further provided with an imaging sensor such as CMOS 313, which will be described later, and is capable of capturing such as an object. In this disclosure, the imaging area of the smart phone 3 is narrower than that of the spherical image capturing device 1. In that sense, the spherical image capturing device 1 is an example of a wide-angle view image capturing device, while the smart phone 3 is an example of a narrow-angle view image capturing device. In addition to the smart phone 3, examples of the narrow-angle view image capturing device include a PC, a smart watch, a display, a game machine, a car navigation system, and a wearable terminal, each of which is capable of capturing a narrow-angle view image and installed with a display control application.

Further, the smart phone 3 receives data of the equirectangular projection image EC generated by the spherical image capturing device 1 based on an image of an object, by wireless communication, and displays a predetermined-area image Q, which is a predetermined area T of the equirectangular projection image EC. Accordingly, the smart phone 3 operates as a communication terminal or a display device.

Example Hardware Configuration

Figure 9:
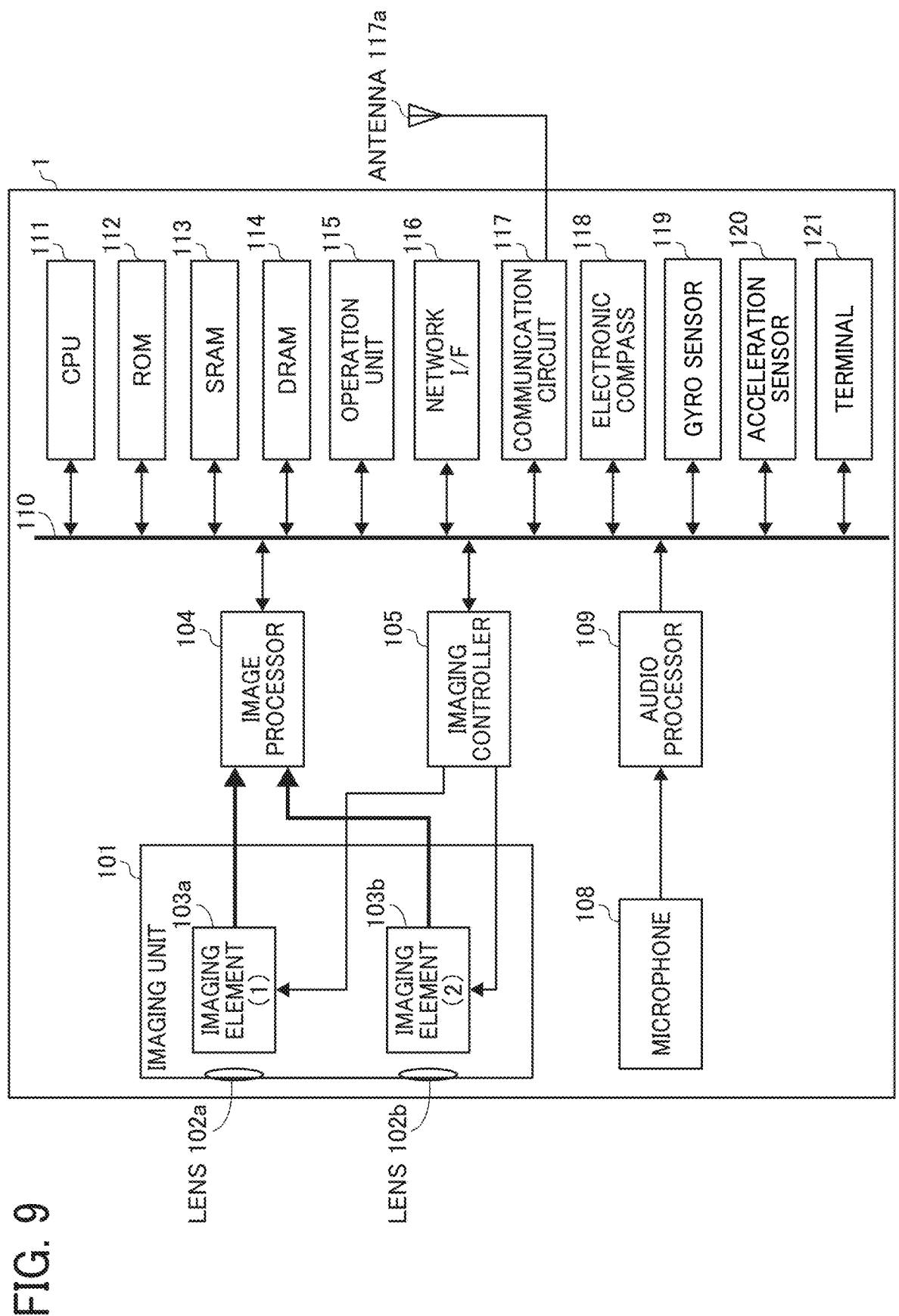
FIG. 9 is a schematic block diagram illustrating a hardware configuration of a spherical image capturing device, according to embodiments.
Figure 10:
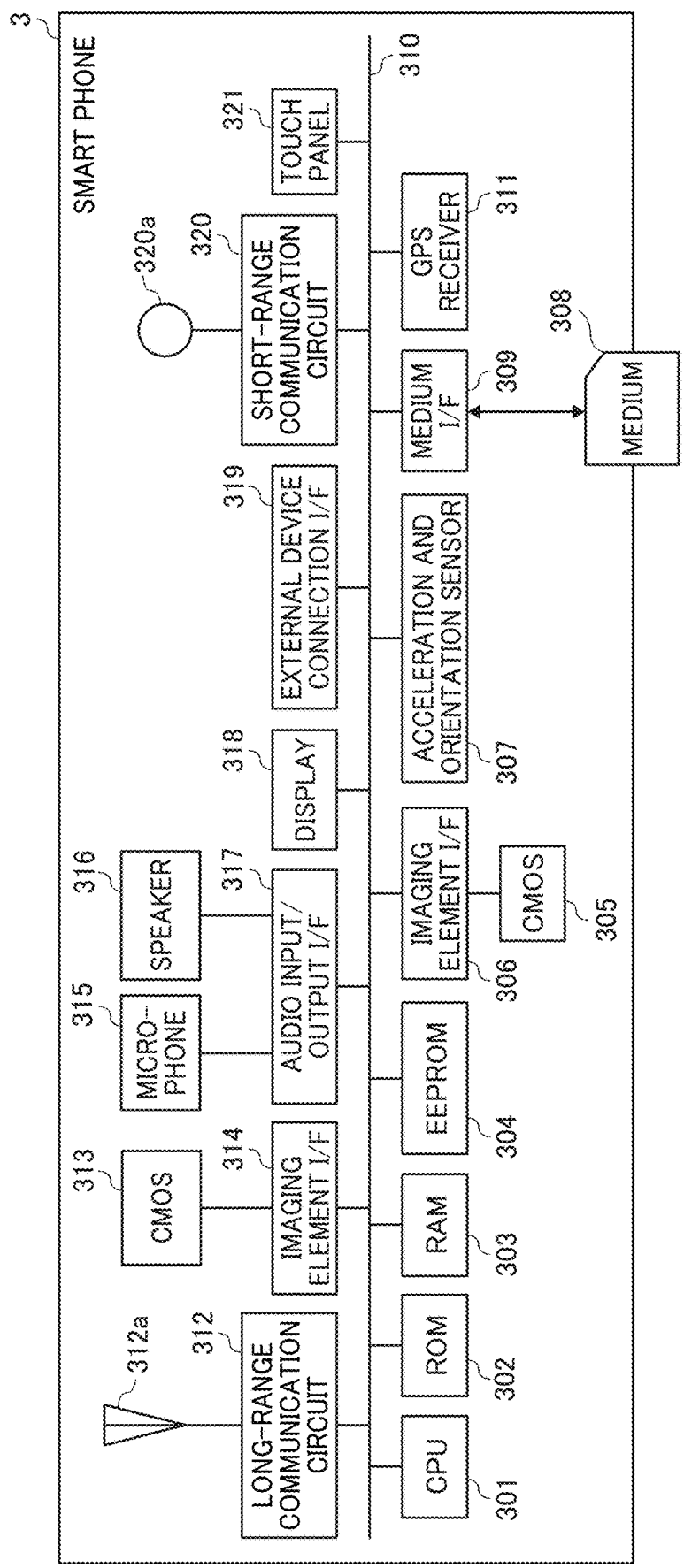
FIG. 10 is a schematic block diagram illustrating a hardware configuration of a smart phone, according to embodiments.

Next, referring to FIGS. 9 and 10, hardware configurations of the spherical image capturing device 1 and smart phone 3 are described according to the embodiment.

Hardware Configuration of Spherical Image Capturing Device

First, referring to FIG. 9, a hardware configuration of the spherical image capturing device 1 is described according to the embodiment. FIG. 9 is a schematic block diagram illustrating a hardware configuration of the spherical image capturing device 1. The following describes a case in which the spherical image capturing device 1 is a full-view spherical (omnidirectional) image capturing device having two imaging elements. However, the spherical image capturing device 1 may include any suitable number of imaging elements, providing that it includes at least two imaging elements. In addition, the spherical image capturing device 1 is not necessarily an image capturing device dedicated to omnidirectional image capturing. Alternatively, an external omnidirectional image capturing unit may be attached to a general-purpose digital camera or a smart phone to implement an image capturing device having substantially the same function as that of the spherical image capturing device 1.

As illustrated in FIG. 9, the spherical image capturing device 1 includes an imaging unit 101, an image processor 104, an imaging controller 105, a microphone 108, an audio processor 109, a central processing unit (CPU) 111, a read only memory (ROM) 112, a static random access memory (SRAM) 113, a dynamic random access memory (DRAM) 114, the operation unit 115, a network interface (I/F) 116, a communication circuit 117, an antenna 117a, an electronic compass 118, a gyro sensor 119, an acceleration sensor 120, and a terminal 121.

The imaging unit 101 includes two wide-angle lenses (so-called fish-eye lenses) 102a and 102b, each having an angle of view of equal to or greater than 180 degrees so as to form a hemispherical image. The imaging unit 101 further includes the two imaging elements 103a and 103b corresponding to the wide-angle lenses 102a and 102b respectively. The imaging elements 103a and 103b each includes an imaging sensor such as a complementary metal oxide semiconductor (CMOS) sensor and a charge-coupled device (CCD) sensor, a timing generation circuit, and a group of registers. The imaging sensor converts an optical image formed by the wide-angle lenses 102a and 102b into electric signals to output image data. The timing generation circuit generates horizontal or vertical synchronization signals, pixel clocks and the like for the imaging sensor. Various commands, parameters and the like for operations of the imaging elements 103a and 103b are set in the group of registers.

Each of the imaging elements 103a and 103b of the imaging unit 101 is connected to the image processor 104 via a parallel I/F bus. In addition, each of the imaging elements 103a and 103b of the imaging unit 101 is connected to the imaging controller 105 via a serial I/F bus such as an I2C bus. The image processor 104, the imaging controller 105, and the audio processor 109 are each connected to the CPU 111 via a bus 110. Furthermore, the ROM 112, the SRAM 113, the DRAM 114, the operation unit 115, the network I/F 116, the communication circuit 117, and the electronic compass 118 are also connected to the bus 110.

The image processor 104 acquires image data from each of the imaging elements 103a and 103b via the parallel I/F bus and performs predetermined processing on each image data. Thereafter, the image processor 104 combines these image data to generate data of the equirectangular projection image as illustrated in FIG. 3C.

The imaging controller 105 usually functions as a master device while the imaging elements 103a and 103b each usually functions as a slave device. The imaging controller 105 sets commands and the like in the group of registers of the imaging elements 103a and 103b via the serial I/F bus such as the I2C bus. The imaging controller 105 receives various commands from the CPU 111. Further, the imaging controller 105 acquires status data and the like of the group of registers of the imaging elements 103a and 103b via the serial I/F bus such as the I2C bus. The imaging controller 105 sends the acquired status data and the like to the CPU 111.

The imaging controller 105 instructs the imaging elements 103a and 103b to output the image data at a time when a shutter button of the operation unit 115 is pressed. In some cases, the spherical image capturing device 1 is capable of displaying a preview image on a display (e.g., a display 318 of the smart phone 3) or displaying a moving image (movie). In case of displaying movie, the image data are continuously output from the imaging elements 103a and 103b at a predetermined frame rate (frames per minute).

Furthermore, the imaging controller 105 operates in cooperation with the CPU 111 to synchronize the time when the imaging element 103a outputs image data and the time when the imaging element 103b outputs the image data. It should be noted that, although the spherical image capturing device 1 does not include a display in this embodiment, the spherical image capturing device 1 may include the display.

The microphone 108 converts sounds to audio data (signal). The audio processor 109 acquires the audio data output from the microphone 108 via an I/F bus and performs predetermined processing on the audio data.

The CPU 111 controls entire operation of the spherical image capturing device 1, for example, by performing predetermined processing. The ROM 112 stores various programs for execution by the CPU 111. The SRAM 113 and the DRAM 114 each operates as a work memory to store programs loaded from the ROM 112 for execution by the CPU 111 or data in current processing. More specifically, in one example, the DRAM 114 stores image data currently processed by the image processor 104 and data of the equirectangular projection image on which processing has been performed.

The operation unit 115 collectively refers to various operation keys, such as the shutter button 115a. In addition to the hardware keys, the operation unit 115 may also include a touch panel. The user operates the operation unit 115 to input various image capturing (photographing) modes or image capturing (photographing) conditions.

The network I/F 116 collectively refers to an interface circuit such as a USB I/F that allows the spherical image capturing device 1 to communicate data with an external medium such as an SD card or an external personal computer. The network I/F 116 supports at least one of wired and wireless communications. The data of the equirectangular projection image, which is stored in the DRAM 114, is stored in the external medium via the network I/F 116 or transmitted to the external device such as the smart phone 3 via the network I/F 116, at any desired time.

The communication circuit 117 communicates data with the external device such as the smart phone 3 via the antenna 117a of the spherical image capturing device 1 by short-range wireless communication such as Wi-Fi, NFC, and Bluetooth. The communication circuit 117 is also capable of transmitting the data of equirectangular projection image to the external device such as the smart phone 3.

The electronic compass 118 calculates an orientation of the spherical image capturing device 1 from the Earth's magnetism to output orientation information. This orientation and tilt information is an example of related information, which is metadata described in compliance with Exif. This information is used for image processing such as image correction of captured images. The related information also includes a date and time when the image is captured by the spherical image capturing device 1, and a size of the image data.

The gyro sensor 119 detects the change in tilt of the spherical image capturing device 1 (roll, pitch, yaw) with movement of the spherical image capturing device 1. The change in angle is one example of related information (metadata) described in compliance with Exif. This information is used for image processing such as image correction of captured images.

The acceleration sensor 120 detects acceleration in three axial directions. The spherical image capturing device 1 calculates its position (an angle with respect to the direction of gravity), based on the acceleration detected by the acceleration sensor 120. With the gyro sensor 119 and the acceleration sensor 120, the spherical image capturing device 1 is able to correct tilt of image with high accuracy.

The terminal 121 is a connector (with a recess) for Micro USB. The terminal 121 is used when communicating via a wired network.

Hardware Configuration of Smart Phone

Referring to FIG. 10, a hardware configuration of the smart phone is described according to the embodiment. FIG. 10 illustrates a hardware configuration of the smart phone.

As illustrated in FIG. 10, the smart phone 3 includes a CPU 301, a ROM 302, a RAM 303, an EEPROM 304, a Complementary Metal Oxide Semiconductor (CMOS) sensor 305, an imaging element I/F 306, an acceleration and orientation sensor 307, a medium I/F 309, and a GPS receiver 311.

The CPU 301 controls entire operation of the smart phone 3. The ROM 302 stores a control program for controlling the CPU 301, such as an initial program loader (IPL). The RAM 303 is used as a work area for the CPU 301. The EEPROM 304 reads or writes various data such as a control program for a smart phone under control of the CPU 301. The CMOS sensor 305 is an example of a built-in imaging device configured to capture an object (mainly, a self-image of a user operating the smart phone 3) under control of the CPU 301 to obtain image data. In alternative to the CMOS sensor 305, an imaging element such as a charge-coupled device (CCD) sensor may be used. The imaging element I/F 306 is a circuit that controls driving of the CMOS sensor 305. The acceleration and orientation sensor 307 includes various sensors such as an electromagnetic compass or gyrocompass for detecting geomagnetism, and an acceleration sensor. The medium I/F 309 controls reading or writing of data with respect to a recording medium 308 such as a flash memory. The GPS receiver 311 receives a GPS signal from a GPS satellite.

The smart phone 3 further includes a long-range communication circuit 312, a CMOS sensor 313, an imaging element I/F 314, a microphone 315, a speaker 316, an audio input/output I/F 317, the display 318, an external device connection I/F 319, a short-range communication circuit 320, an antenna 320a for the short-range communication circuit 320, and a touch panel 321.

The long-range communication circuit 312 is a circuit that enables the smart phone 3 to communicate with other device through the communication network 100. The CMOS sensor 313 is an example of a built-in imaging device capable of capturing a subject to obtain image data under control of the CPU 301. The imaging element I/F 314 is a circuit that controls driving of the CMOS sensor 313. The microphone 315 is a built-in circuit that converts sound into an electric signal. The speaker 316 is a built-in circuit that generates sound such as music or voice by converting an electric signal into physical vibration. The audio I/O I/F 317 is a circuit for inputting or outputting an audio signal to the microphone 315 or from the speaker 316 under control of the CPU 301. The display 318 is an example of a display device that displays an image of the object, various icons, etc. Examples of the display 318 include a liquid crystal display (LCD) and an organic electroluminescence (EL) display. The external device connection I/F 319 is an interface circuit that connects the smart phone 3 to various external devices. The short-range communication circuit 320 is a communication circuit that communicates in compliance with the near field communication (NFC), the Bluetooth (Registered Trademark), and the like. The touch panel 321 is an example of an input device configured to enable a user to operate the smart phone 3 by touching a screen of the display 318.

The smart phone 3 further includes a bus line 310. The bus line 310 is an address bus or a data bus, which electrically connects the elements in FIG. 10 such as the CPU 301.

Example Functional Configuration

Figure 11:
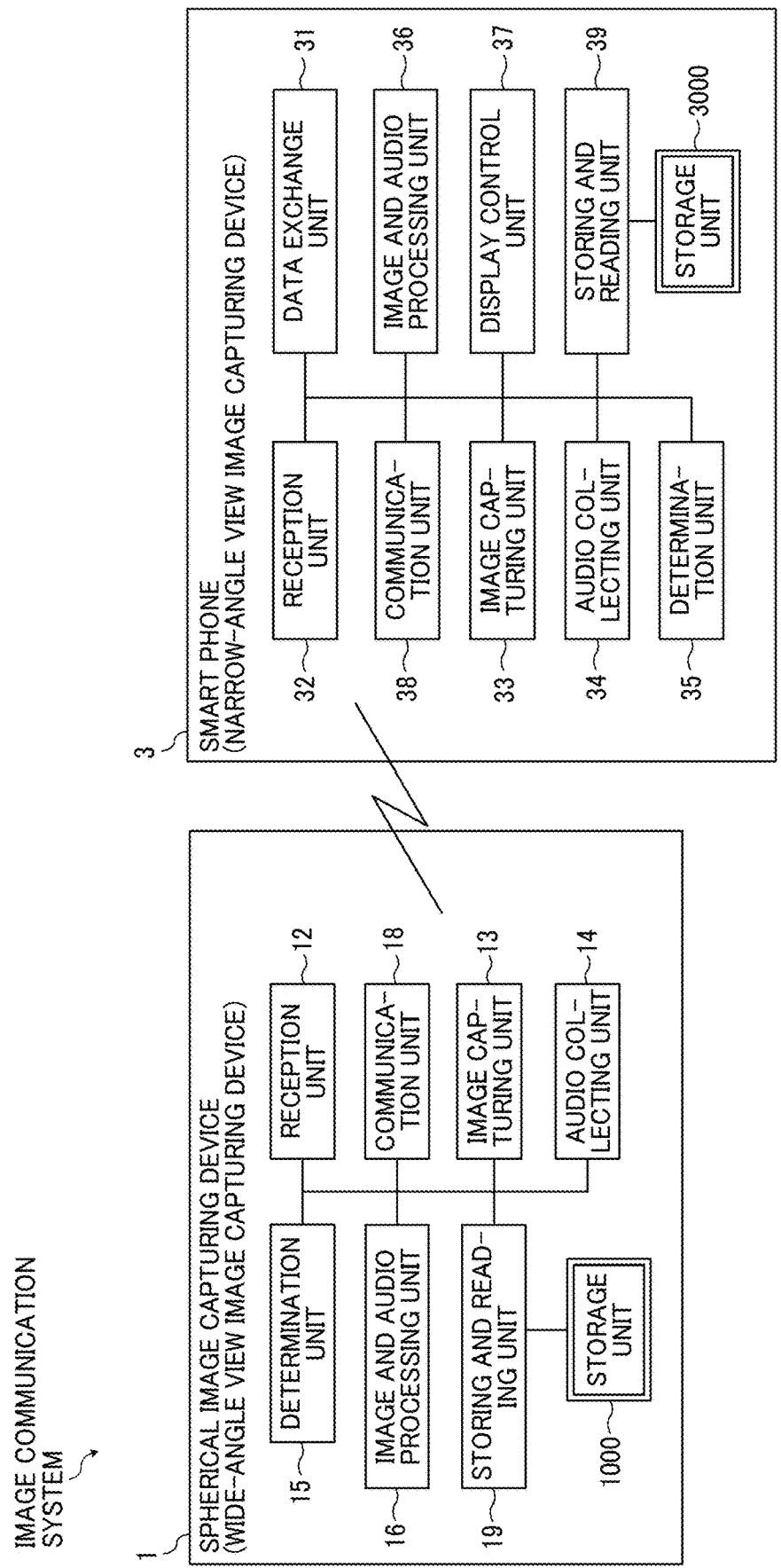
FIG. 11 is a schematic block diagram illustrating a functional configuration of the image communication system of FIG. 1 according to the first embodiment.

Referring now to FIGS. 9 to 11, a functional configuration of the image communication system is described according to the embodiment. FIG. 11 is a schematic block diagram illustrating a functional configuration of the image communication system according to the first embodiment.

Functional Configuration of Spherical Image Capturing Device

As illustrated in FIG. 11, the spherical image capturing device 1 includes a reception unit 12, an image capturing unit 13, an audio collecting unit 14, a determination unit 15, an image and audio processing unit 16, a communication unit 18, and a storing and reading unit 19. These units are functions that are implemented by or that are caused to function by operating any of the elements illustrated in FIG. 9 in cooperation with the instructions of the CPU 111 according to the control program for the spherical image capturing device expanded from the SRAM 113 to the DRAM 114.

The spherical image capturing device 1 further includes a storage unit 1000, which is implemented by the ROM 112, the SRAM 113, and the DRAM 114 illustrated in FIG. 9.

Functional Configuration of Spherical Image Capturing Device

Referring to FIGS. 9 to 11, a functional configuration of the spherical image capturing device 1 is described in detail.

The reception unit 12 of the spherical image capturing device 1 is implemented by the operation unit 115 illustrated in FIG. 9, which operates under control of the CPU 111. The reception unit 12 receives an instruction input from the operation unit 115 according to a user operation.

The image capturing unit 13 is implemented by the imaging unit 101, the image processor 104, and the imaging controller 105, illustrated in FIG. 9, each operating under control of the CPU 111. The image capturing unit 13 captures an image of the object and its surroundings to obtain captured image data. As the captured image data, the two hemispherical images, from which the spherical image is generated, are obtained as illustrated in FIGS. 3A and 3B.

The audio collecting unit 14 is implemented by the microphone 108 and the audio processor 109 illustrated in FIG. 9, each of which operates under control of the CPU 111. The audio collecting unit 14 collects sounds around the spherical image capturing device 1.

The determination unit 15, which is implemented by instructions of the CPU 111, performs various determinations.

The image and audio processing unit 16, which is implemented by instructions of the CPU 111 to the image processor 104, combines the two hemispherical images illustrated in FIGS. 3A and 3B to generate an equirectangular projection image EC as illustrated in FIG. 3C. The image and audio processing unit 16, which is implemented by instructions of the CPU 111 to the audio processor 109, generates audio data from audio signals of collected sounds.

The communication unit 18, which is implemented by instructions of the CPU 111 to the communication circuit 117, communicates data with a communication unit 38 of the smart phone 3, to be described below, using the short-range wireless communication. In the case of wired communication, the communication unit 18 is implemented by instructions of the CPU 111 with respect to the terminal 121, to control data communication while receiving power supply from the smart phone 3 via the terminal 121.

The storing and reading unit 19, which is implemented by instructions of the CPU 111 illustrated in FIG. 9, stores various data or information in the storage unit 1000 or reads out various data or information from the storage unit 1000.

Functional Configuration of Smart Phone

Referring now to FIGS. 10 and 11, a functional configuration of the smart phone 3 is described according to the embodiment. As illustrated in FIG. 11, the smart phone 3 includes a data exchange unit 31, a reception unit 32, an image capturing unit 33, an audio collecting unit 34, a determination unit 35, an image and audio processing unit 36, a display control unit 37, the communication unit 38, and a storing and reading unit 39. These units are functions that are implemented by or that are caused to function by operating any of the hardware elements illustrated in FIG. 10 in cooperation with the instructions of the CPU 301 according to the control program for the smart phone 3, expanded from the EEPROM 304 to the RAM 303.

The smart phone 3 further includes a storage unit 3000, which is implemented by the RAM 303 and EEPROM 304 illustrated in FIG. 10.

Functional Configuration of Smart Phone

The data exchange unit 31 of the smart phone 3 is implemented by the long-range communication circuit 312 that operates under control of the CPU 301, illustrated in FIG. 10, to transmit or receive various data or information to or from other device (for example, an image management server 5 to be described below) through a communication network such as the Internet.

The reception unit 32 is implemented by the touch panel 321, which operates under control of the CPU 301, to receive various selections or inputs from the user.

The image capturing unit 33, which is implemented by the instructions of the CPU 301 with respect to the CMOS 305 via the imaging element I/F 306 or the CMOS 313 via the imaging element I/F 314, captures an image of the object or surroundings to obtain captured image data. The captured image, captured with the smart phone 3, is an example of a narrow-angle view image.

The audio collecting unit 34, which is implemented by the instructions of the CPU 301 to the microphone 315 via the audio input/output I/F 317, collects sounds around the smart phone 3.

The determination unit 35, which is implemented by instructions of the CPU 301, performs various determinations, to be described below.

The image and audio processing unit 36, which is implemented by the instructions of the CPU 111, applies image processing to the image data obtained from the CMOS 305 via the imaging element I/F 306 or from the CMOS 313 via the imaging element I/F 314. The image and audio processing unit 36 performs image processing on the equirectangular projection image EC, received from the spherical image capturing device 1. The image and audio processing unit 36, which is implemented by instructions of the CPU 111, generates audio data from audio signals of sounds collected at the microphone 315. The image and audio processing unit 36 converts audio data sent from the spherical image capturing device 1 into an audio signal and outputs audio based on the audio signal from the speaker 316 via the audio input/output I/F 317.

The display control unit 37, which is implemented by the instructions of the CPU 301, controls the display 318 to display various screens. Examples of processing to display will be described below.

The communication unit 38, which is implemented by the instructions of the CPU 301 with respect to the short-range communication circuit 320, performs data communication with the communication unit 18 of the spherical image capturing device 1. In the case of wired communication, the communication unit 38 is implemented by instructions of the CPU 301 with respect to the external device connection I/F 319, to control power supply or communication of image data with the spherical image capturing device 1 via the communication cable.

The storing and reading unit 39, which is implemented by instructions of the CPU 301, stores various data or information in the storage unit 3000 or reads out various data or information from the storage unit 3000.

Example Operation

Linked Image Capturing Processing

Figure 12:
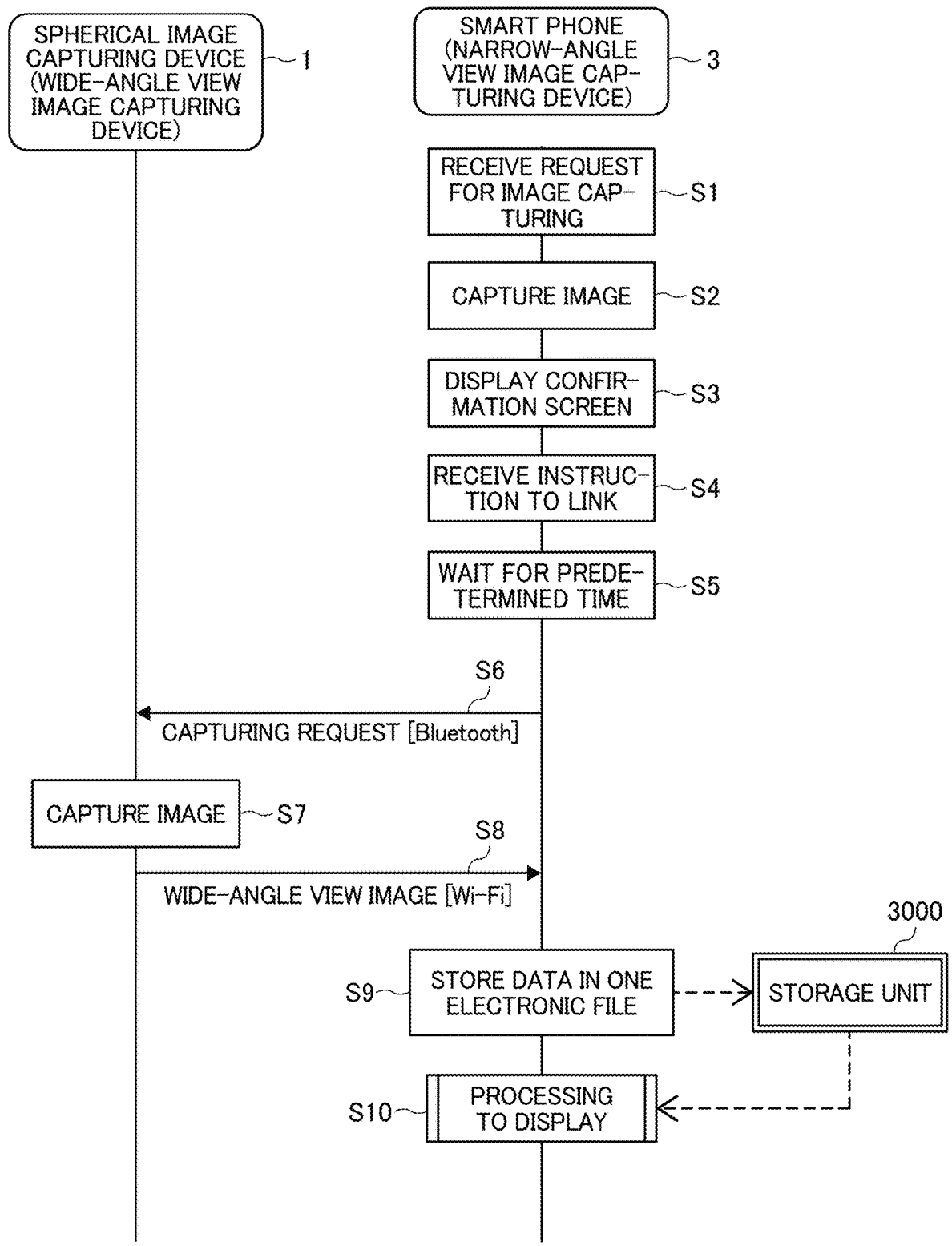
FIG. 12 is a data sequence diagram illustrating linked image capturing processing, performed by the image communication system, according to the first embodiment.
Figure 13A:
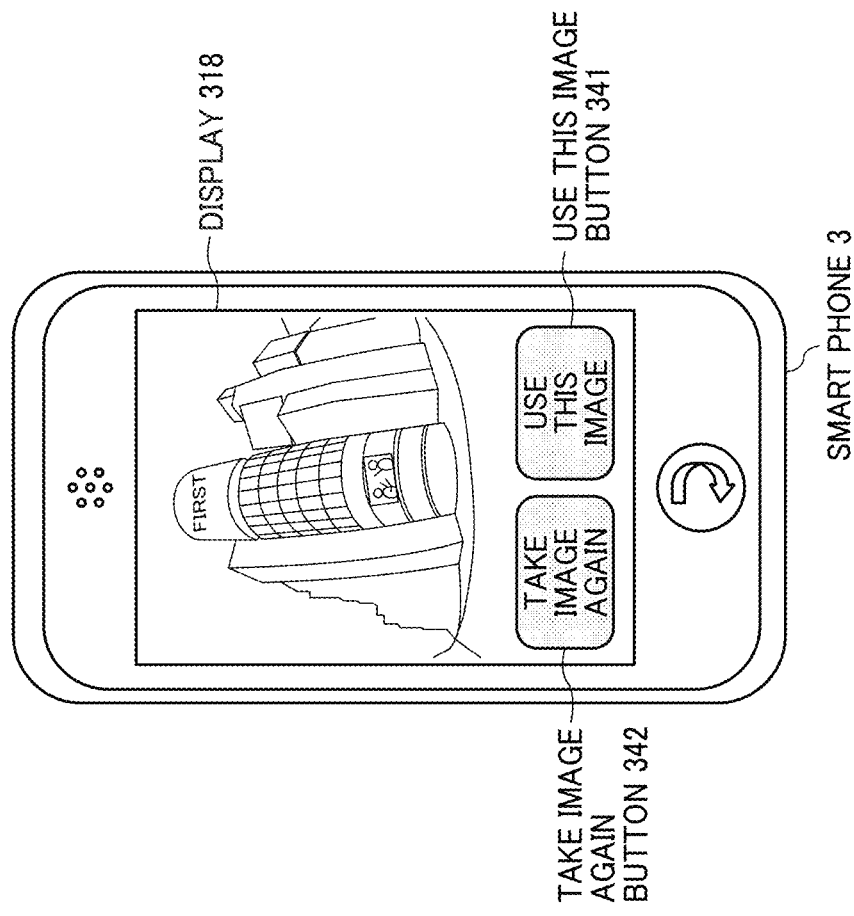
FIG. 13A is an example display screen of the smart phone at the start of image capturing.
Figure 13B:
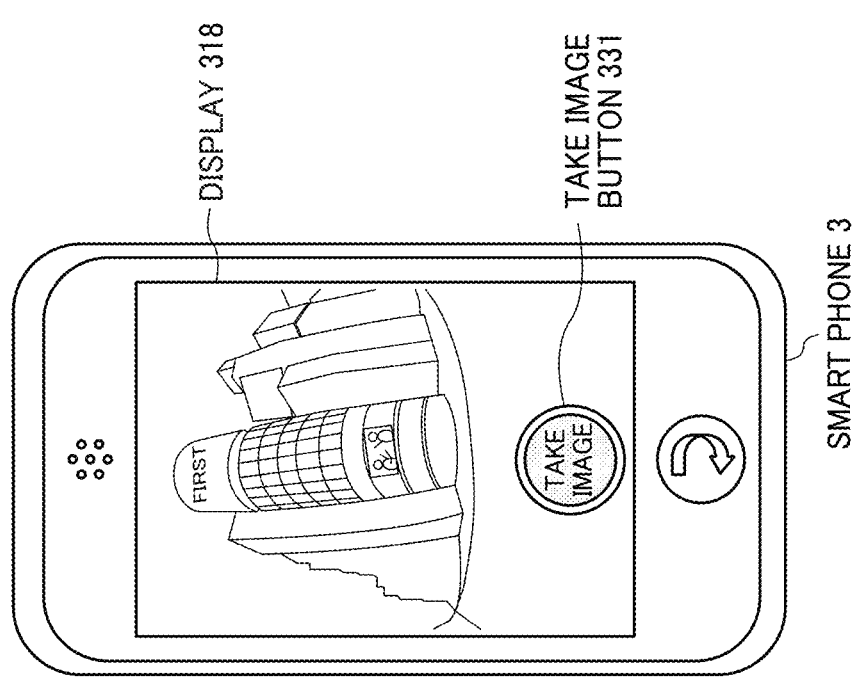
FIG. 13B is an example display screen of the smart phone at the start of linked image capturing processing.

First, referring to FIG. 12, processing of capturing images, performed by the smart phone 3 and the spherical image capturing device 1 operating in cooperation, is described according to the embodiment. FIG. 12 is a sequence diagram illustrating linked image capturing processing according to the first embodiment. FIG. 13A is an example display screen of the smart phone at the start of image capturing. FIG. 13B is an example of display screen of the smart phone at the start of linking image capturing processing. Prior to processing of FIG. 12, it is assumed that a connection is established between the smart phone 3 and the spherical image capturing device 1 to enable communication via Wi-Fi and Bluetooth. For example, the smart phone 3 establishes a connection with the spherical image capturing device 1 according to a control program stored in the storage unit 3000, to be ready for communication of data with the spherical image capturing device 1.

First, as illustrated in FIG. 13A, as the user A turns a side surface of the smart phone 3 provided with the CMOS 313 toward a target object, the display control unit 37 controls the display 318 to display an image capturing preparation screen of FIG. 13A, which includes an image to be captured. The image capturing preparation screen further includes an image capturing start (TAKE IMAGE) button 331, which is displayed at a lower portion of the display 318. When the user A presses the image capturing start button 331, the reception unit 32 of the smart phone 3 receives a request for starting image capturing (S1). In response to the request, the image capturing unit 33 captures an image of the target object. The image and audio processing unit 36 generates narrow-angle view image data (S2). In this case, the audio collecting unit 34 may collect sounds to generate audio data, and associate the audio data with the narrow-angle view image data.

Next, as illustrated in FIG. 13B, the display control unit 37 displays a confirmation screen, which includes an image having been captured at a central to upper portion of the display 318, and the "USE THIS IMAGE" button 341 and the "TAKE IMAGE AGAIN" button 342 at the lower portion of the display 318 (S3). The "USE THIS IMAGE" button 341 is a button, when pressed by the user A, selects the image currently displayed as an image to be used for linked image capturing processing with the spherical image capturing device 1. The "TAKE IMAGE AGAIN" button 342 is a button to be pressed by the user A, when the user A wants to return to the image capturing preparation screen of FIG. 13A without using the currently-displayed image for linked image capturing processing with the spherical image capturing device 1. Text (characters) being displayed on the "USE THIS IMAGE" button 341 is not limited to this example, as long as a message indicates that linked image capturing processing starts.

Next, when the "USE THIS IMAGE" button 341 is pressed by the user A, the reception unit 32 of the smart phone 3 receives a request for linked image capturing processing (S4). The image capturing unit 33 of the smart phone 3 waits for a predetermined time period (S5). For example, the predetermined time period may be set to 3 seconds. With this waiting time, when the user A himself or herself is the target object to be captured as instructed at S2, the user A can either pick up the spherical image capturing device 1 in addition to the smart phone 3, or changes from the smart phone 3 to the spherical image capturing device 1, to be ready for image capturing. In another example, assuming that the smart phone 3 and the spherical image capturing device 1 are relatively apart away from each other, after the user A captures a specific object with the smart phone 3, the user A may turn his or her back to the spherical image capturing device 1 in about 3 seconds. This prevents a face of the user A from being taken by the spherical image capturing device 1.

Next, the communication unit 38 of the smart phone 3 transmits image capturing request information indicating a request for starting image capturing (capturing request) to the spherical image capturing device 1 by Bluetooth (S6).

Accordingly, the communication unit 18 of the spherical image capturing device 1 receives the image capturing request information. At the image capturing device 1, the image capturing unit 13 captures the target object and its surroundings (such as scenery), to obtain two items of hemispherical image data. The image and audio processing unit 16 generates equirectangular projection image, from these two items of hemispherical image data, as wide-angle view image data (S7).

Next, the communication unit 18 of the spherical image capturing device 1 transmits the wide-angle view image data obtained at S7 to the smart phone 3 by Wi-Fi (S8). Accordingly, the communication unit 38 of the smart phone 3 receives the wide-angle view image data. The Bluetooth used for transmission and reception of capturing request at S6 is an example of a first communication method, and the Wi-Fi used for transmission and reception of captured image data at S8 is an example of a second communication method.

Through processing of S4 to S8, the smart phone 3 can acquire wide-angle view image data that cannot be obtained by capturing with its own terminal. Further, the time to capture image data is synchronized by this linking image capturing processing between the smart phone 3 and the spherical image capturing device 1.

Next, the image and audio processing unit 36 of the smart phone 3 stores the narrow-angle view image data obtained at S2 and the wide-angle view image data obtained at S8 in the same, one electronic file. The storing and reading unit 39 stores data of this electronic file in the storage unit 3000 (S9). Then, the smart phone 3 controls the display 318 to display the narrow-angle view image and the wide-angle view image (S10).

Display Processing

Figure 14:
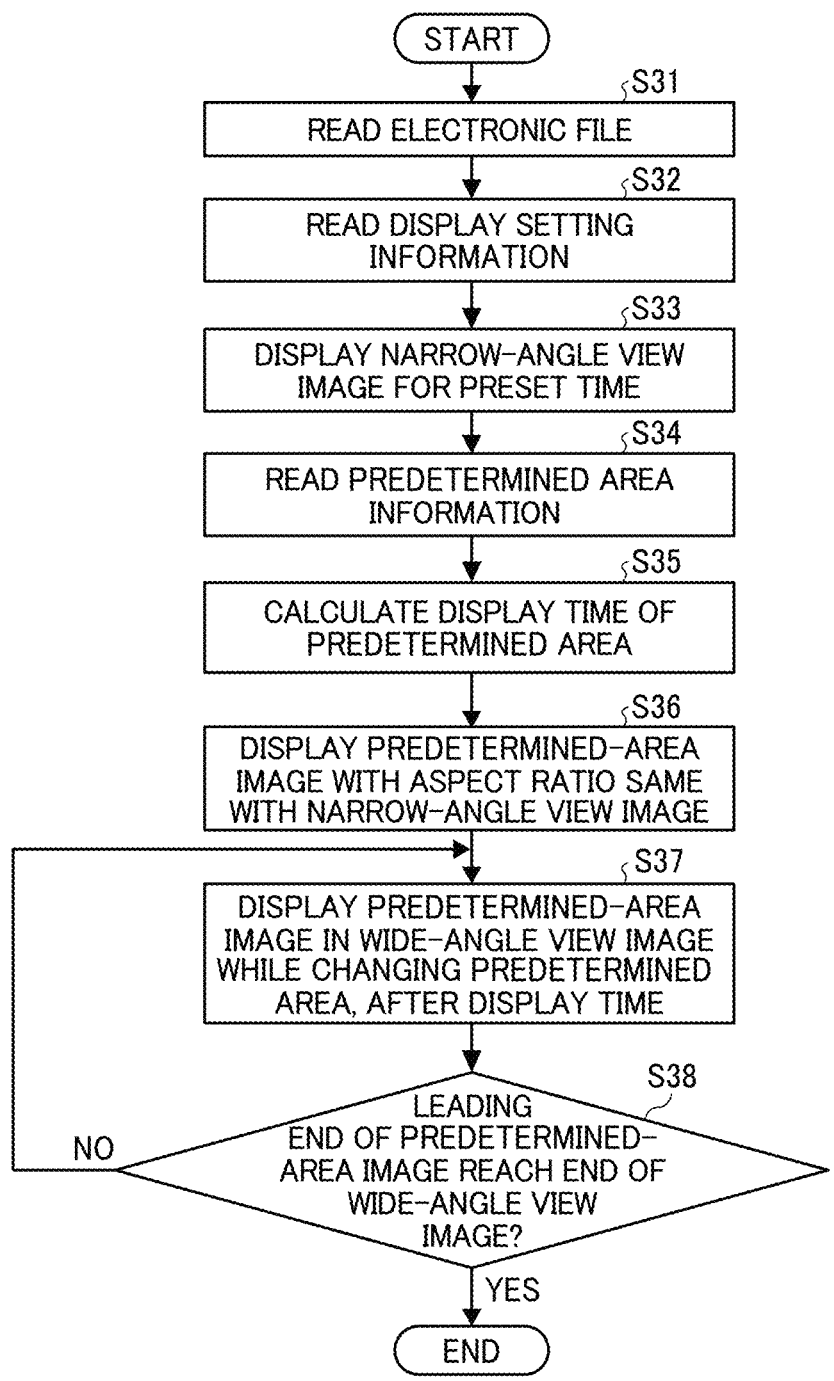
FIG. 14 is a flowchart illustrating processing to display a predetermined-area image according to the first embodiment.
Figure 15:
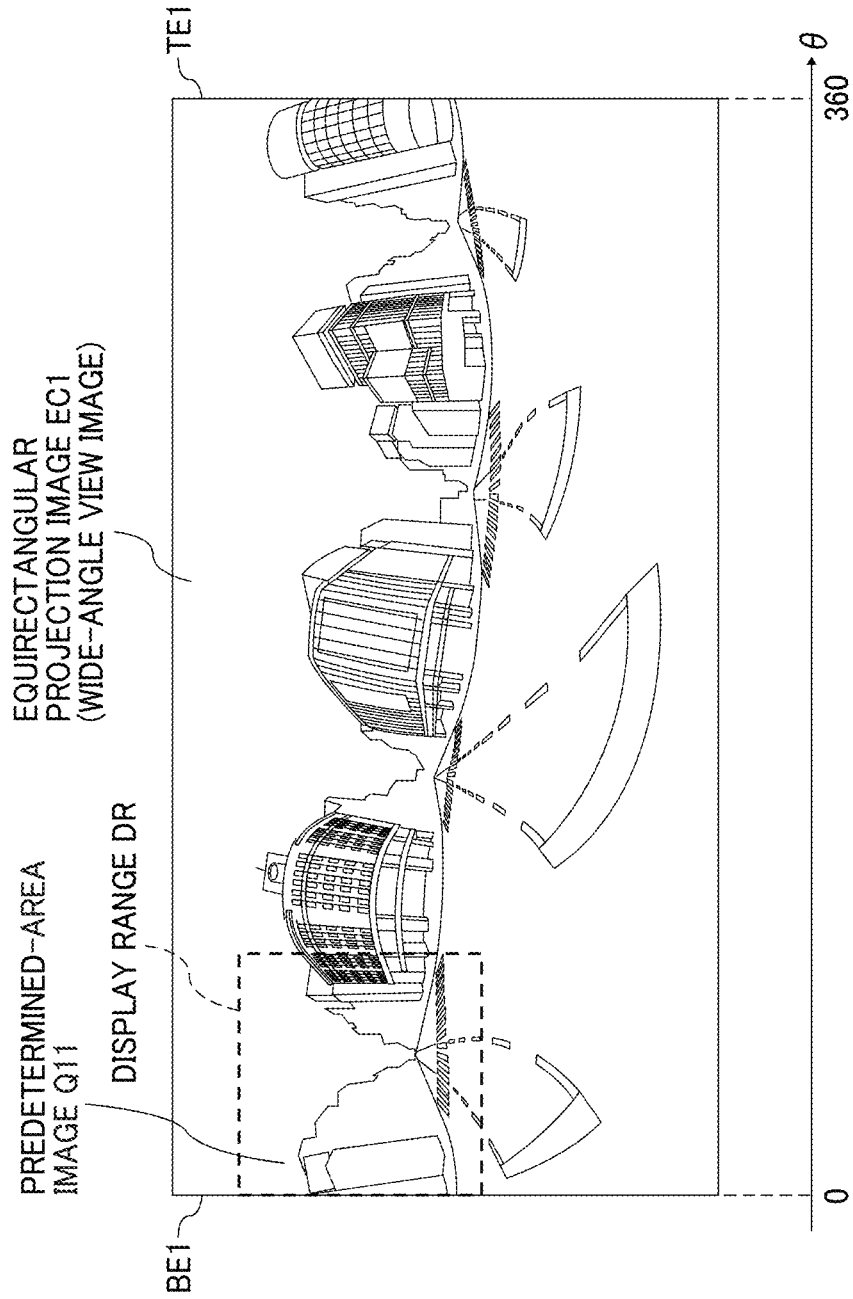
FIG. 15 is a diagram illustrating the relationship between the equirectangular projection image and the predetermined-area image.
Figure 16:
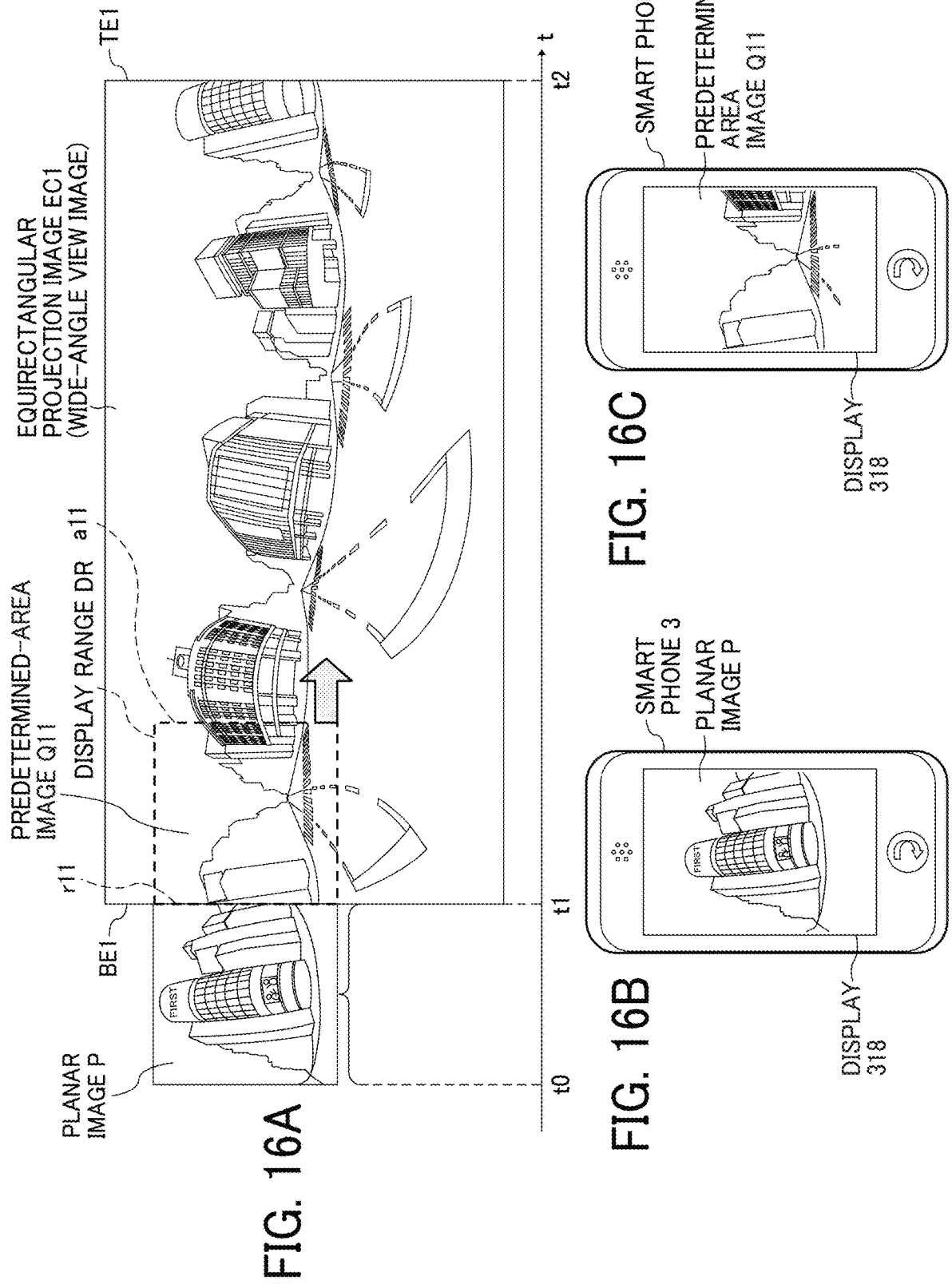
FIG. 16A is an illustration for explaining a time in which the planar image is displayed, and a time in which the predetermined-area image corresponding to a predetermined area of the equirectangular projection image is displayed.
FIG. 16B is an example planar image displayed on the smart phone.
FIG. 16C is an example predetermined-area image, of the equirectangular projection image, displayed on the smart phone.

Referring now to FIGS. 14 and 16C, example processing to display images performed at S10 is described. FIG. 14 is a flowchart illustrating processing to display a predetermined-area image according to the first embodiment. FIG. 15 is a diagram illustrating the relationship between the equirectangular projection image and the predetermined-area image. FIG. 16A illustrates a time in which the planar image is displayed, and a time in which the predetermined-area image corresponding to a predetermined area of the equirectangular projection image is displayed. FIG. 16B illustrates a planar image displayed on the smart phone. FIG. 16C illustrates a predetermined-area image, of the equirectangular projection image, displayed on the smart phone. The processing of displaying images is performed by the smart phone 3, according to the control program stored in the storage unit 3000.

First, the storing and reading unit 39 of the smart phone 3 reads out data of the electronic file from the storage unit 3000 having been stored at S9 (S31). Referring to FIG. 15, the relationship between the equirectangular projection image stored in the electronic file and the predetermined-area image corresponding to the predetermined area of the equirectangular projection image is described.

FIG. 15 is a diagram illustrating the relationship between the equirectangular projection image and the predetermined-area image. As illustrated in FIG. 15, an equirectangular projection image EC1, which is an example of a wide-angle view image, can be expressed using a pan angle θ in the imaging direction of the virtual camera IC (see FIG. 7), starting from the start point BE1 to the end point TE1.

Specifically, the pan angle θ of the equirectangular projection image EC1 is equal to or greater than 0 degree, but less than 360 degrees.

As described above, the predetermined-area image Q is an image of an area in the equirectangular projection image EC (an example of wide-angle view image), which is displayed to the user when the predetermined-area image Q is displayed on the display 318. Further, a range of the wide-angle view image to be displayed to the user at a time, such as via the display 318, is referred to as a display range DR. In this embodiment, an area (referred to as a predetermined area) in the equirectangular projection image EC being displayed to the user at a time changes, according to a display range DR. That is, different areas (referred to as different predetermined areas) in the equirectangular projection image EC are displayed to the user at different times, as the display range DR changes. Of those different predetermined areas, the predetermined-area image Q11 is an area in the equirectangular projection image EC1, which is set as a range that is firstly displayed to the user via the display 318. The predetermined-area image Q11 is set according to the predetermined-area information, for example, by the user via the smart phone 3. In this specific example, the predetermined-area image Q11 is set as an area of the equirectangular projection image EC corresponding to the planar image. The image of the predetermined area (that is, the predetermined-area image) of the equirectangular projection image (an example of wide-angle view image), which is determined according to a display range DR of the equirectangular projection image via the display 318, can be expressed by a specific value of pan angle θ. The pan angle θ is any value equal to or greater than 0 but less than 360 degrees. As described below, in this example, a displayable range of the wide-angle view image, which is the entire area of the wide-angle view image, can be expressed by pan angle θ of 360 degrees. With the value of θ, as illustrated in FIG. 15, the display range DR of the equirectangular projection image EC1 and a corresponding predetermined-area image are determined.

Next, referring back to FIG. 14, the storing and reading unit 39 reads out display setting information stored in the storage unit 3000 (S32). The display setting information includes information on a display time of the narrow-angle view image, a displayable range of the wide-angle view image that can be displayed via the display 318, and a total display time it takes until display of all different predetermined-area images completes as the display range DR moves throughout the wide-angle view image. This display setting information is previously stored in the storage unit 3000, for example, by the user A. In such case, in order to make sure that the predetermined-area image of the wide-angle view image is displayed all the way to the end (for example, after display of the narrow-angle view image), the smart phone 3 accepts an input value of display time only when the input value of display time is longer than 0 second. For example, the display setting information is set so that the display time of the narrow-angle view image is 1.0 second, the displayable range of the wide-angle view image is 360 degrees, and the total display time for displaying all different predetermined-area images of the wide-angle view image by movement of the display range DR throughout the wide-angle view image is 1.8 seconds.

Next, as illustrated in FIG. 16B, the display control unit 37 displays, on the display 318, a planar image P (narrow-angle view image) based on the narrow-angle view image data in the electronic file read out at S31 for a predetermined (preset) time (S33). The predetermined time here corresponds to the display time of the narrow-angle view image (for example, 1.0 second). In this case, as illustrated in FIG. 16A, the planar image P, as the narrow-angle view image, is displayed from t0 (time is 0) to t1 (time is one second), for 1.0 second.

Next, the and reading unit 39 reads out the predetermined area information on the predetermined area T (see FIG. 6A) stored in the storage unit 3000 (S34). This predetermined area information indicates the center point CP and the angle of view α of the predetermined area T (see FIG. 7). For example, the predetermined area T and the angle of view α are set in advance on the smart phone 3 by the user A, such that the predetermined area information may be stored in the storage unit 3000 of the smart phone 3.

Next, the display control unit 37 calculates a display time of the predetermined-area image, which is a time period during which an image of a certain predetermined area T is kept displayed (S35). For example, the display control unit 37 calculates the display time of the predetermined-area image, by diving the total display time by the displayable range of the wide-angle view image, based on the display setting information read at S32. Specifically, the display control unit 37 obtains 1.8 seconds/360 degrees=0.005 seconds (5 milliseconds) in this case. That is, all different predetermined-area images are displayed, while the display range DR of the wide-angle view image moves to change the value of θ by 1 degree at every 0.005 seconds, until the entire wide-angle view image is displayed.

As illustrated in FIG. 16C, the display control unit 37 starts displaying the predetermined-area image Q11 on the display 318, which is the image of the predetermined area to be displayed first as the display range DR, with the same aspect ratio as the planar image P (an example of narrow-angle view image) (S36). In this case, as illustrated in FIG. 16A, a rear end r11 of the display range DR with respect to the moving direction, is positioned at the start point BE1 of the equirectangular projection image EC1 (an example of wide-angle view image).

Next, after the above-calculated display time of the predetermined-area image (for example, 0.005 seconds), the display control unit 37 moves the display range DR by certain angle, such as one degree (for example, θ=1°), to display a predetermined-area image corresponding to the display range DR having θ of 1 degree. That is, the image of a predetermined area being displayed on the display 318 changes, as the display range DR moves in the moving direction, from the start point BE1 to the end point TE1 of the equirectangular projection image EC1 (S37). The moving direction is a direction indicated by an arrow (right direction) in FIG. 16A. Here, the direction indicated by the arrow is a direction parallel to the equator in the spherical image.

Next, the determination unit 35 determines whether the leading end a11 of the display range DR with respect to the moving direction has reached the end point TE1 of the equirectangular projection image EC1 (an example of wide-angle view image) (S38). When it is determined that the leading end a11 has not reached (S38: NO), operation returns to S37. After the display time of the predetermined-area image (for example, 0.005 seconds), the display control unit 37 again moves the display range DR by one degree of pan angle of imaging direction (for example, θ=1°), and displays on the display 318 a predetermined-area image corresponding to the display range DR having been moved (with θ of 2 degrees). Through repeating processing of S37 and S38, as illustrated in FIG. 16A, the display range DR moves in the direction of the arrow. Finally, the leading end a11 of the display range DR reaches the end point TE1 of the equirectangular projection image EC11 (an example of wide-angle view image).

When the leading end a11 of the display range DR reaches the end point TE1 of the equirectangular projection image EC11 (an example of wide-angle view image) (S38: YES), S10 of processing to display ends. In this example, it is assumed that display of all different predetermined-area images completes at t2, which is 1.8 seconds. Accordingly, linked image capturing processing of FIG. 12 ends. In this way, the display control unit 37 displays all different predetermined-area images, in a manner that the display range DR moves (changes) until the entire wide-angle view image is displayed to the user. Instead of displaying the entire wide-angle view image, the display control unit 37 may cause the display range DR move to display a part of the wide-angle image.

According to the present embodiment, as illustrated in FIGS. 16A to 16C, the display control unit 37 displays the narrow-angle view image obtained firstly by capturing an image with the smart phone 3, for a predetermined time period. Then, the display control unit 37 displays different predetermined-area images, while moving the display range DR throughout the wide-angle view image, which is obtained by the spherical image capturing device 1 by linked image capturing processing as described above. Accordingly, even if a viewer of the narrow-angle view image does not recognize where the captured image is taken under what situation just by looking at an object in the narrow-angle view image, the viewer can easily recognize the place or the situation once the predetermined-area images with different predetermined areas are displayed.

In this embodiment, the display control unit 37 does not reproduce an image of each predetermined area T in the equirectangular projection image EC1 as one frame of video data, but displays the predetermined-area image corresponding to the predetermined area T in the equirectangular projection image EC1, while shifting the predetermined area T subjected to displaying. Accordingly, in the present embodiment, encoding of video image is not required, such that respective predetermined areas T in the equirectangular projection image EC1 can be displayed seamlessly like a moving image. This also reduces processing load due to encoding processing.

Variation

Figure 17:
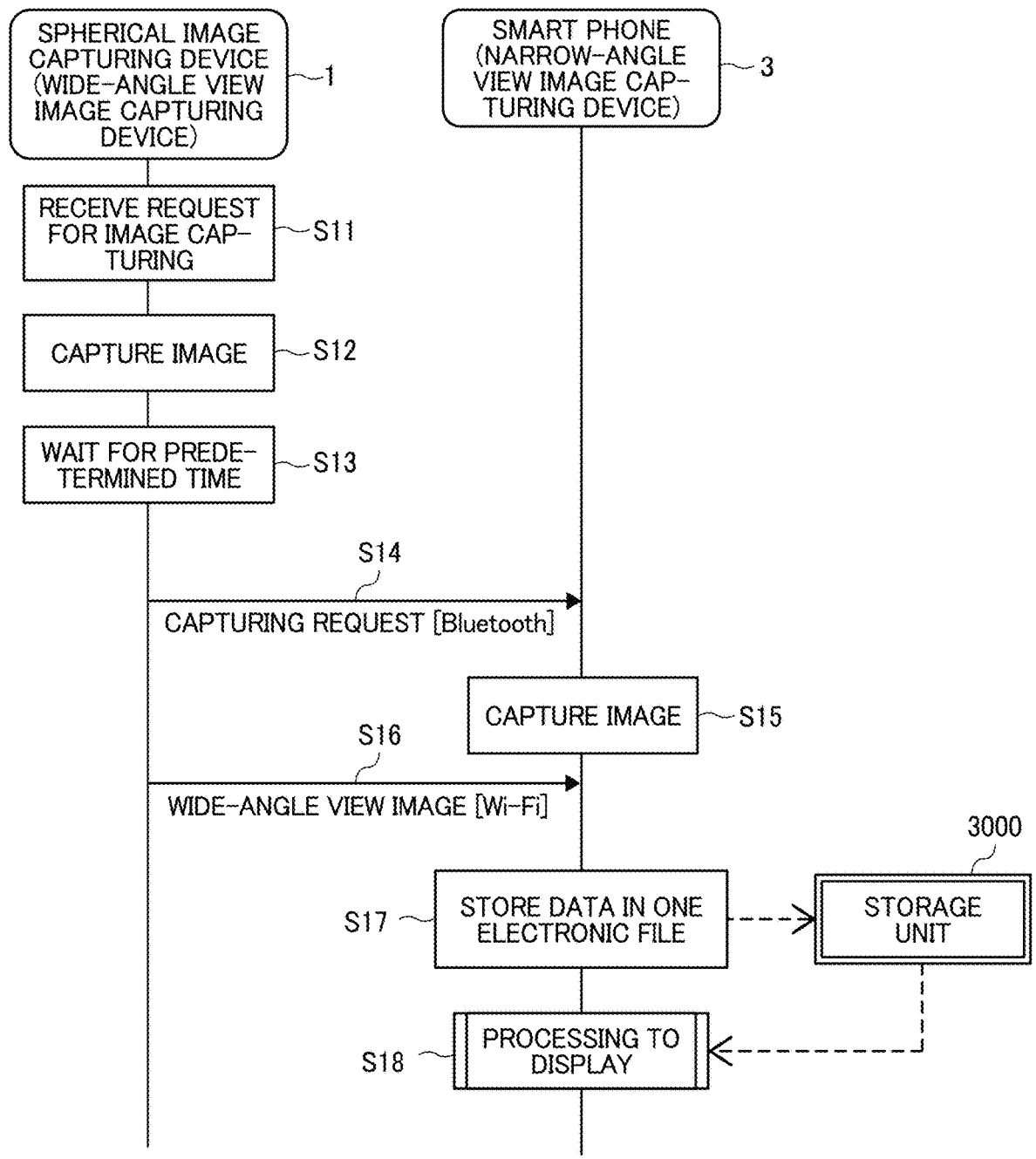
FIG. 17 is a sequence diagram illustrating linked image capturing processing according to a variation of the first embodiment.

Referring now to FIG. 17, another example of linked image capturing processing is described as a variation of the example described above referring to FIG. 12. FIG. 17 is a sequence diagram illustrating linked image capturing processing according to a variation of the first embodiment. In FIG. 12, a notification is sent to the spherical image capturing device 1, at the time when the smart phone 3 starts image capturing, to start linked image capturing. Alternatively, in FIG. 17, a notification is sent to the smart phone 3 at the time when the spherical image capturing device 1 starts image capturing. The details will be described below. Prior to processing of FIG. 12, it is assumed that a connection is established between the smart phone 3 and the spherical image capturing device 1 to enable communication via Wi-Fi and Bluetooth.

First, the reception unit 12 of the spherical image capturing device 1 receives a request for capturing an image from the user A (S11). The image capturing unit 13 captures a target object and its surroundings (such as scenery), to obtain two items of hemispherical image data. The image and audio processing unit 16 generates equirectangular projection image, from these two items of hemispherical image data, as wide-angle view image data (S12). In this case, the audio collecting unit 14 may collect sounds to generate audio data, and associate the audio data with the wide-angle view image data.

The image capturing unit 13 of the spherical image capturing device 1 waits for a predetermined time (S13). For example, the predetermined time may be set to 3 seconds. With this waiting time, when the user A himself or herself is the target object to be captured as instructed at S12, the user A can either pick up the smart phone 3 in addition to the spherical image capturing device 1, or changes from the spherical image capturing device 1 to the smart phone 3, to be ready for image capturing.

Next, the communication unit 18 of the spherical image capturing device 1 transmits image capturing request information indicating a request for starting image capturing (capturing request) to the smart phone 3 by Bluetooth (S14). The communication unit 38 of the smart phone 3 receives the image capturing request information. Accordingly, at the smart phone 3, the image capturing unit 33 captures an image of the target object. The image and audio processing unit 36 generates narrow-angle view image data (S15).

Next, the communication unit 18 of the spherical image capturing device 1 transmits the wide-angle view image data obtained at S12 to the smart phone 3 by Wi-Fi (S16). Accordingly, the communication unit 38 of the smart phone 3 receives the wide-angle view image data. The Bluetooth used for transmission and reception of capturing request at S14 is an example of a first communication method, and the Wi-Fi used for transmission and reception of captured image data at S16 is an example of a second communication method.

Through processing of S11 to S16, the smart phone 3 can acquire wide-angle view image data that cannot be obtained by capturing with its own terminal. Further, the time to capture image data is synchronized by this linking image capturing processing between the smart phone 3 and the spherical image capturing device 1.

Next, the image and audio processing unit 36 of the smart phone 3 stores the narrow-angle view image data obtained at S15 and the wide-angle view image data obtained at S16 in the same, one electronic file. The storing and reading unit 39 stores data of this electronic file in the storage unit 3000 (S17). Then, the smart phone 3 controls the display 318 to display the narrow-angle view image and the wide-angle view image (S18). S18 of FIG. 17 is performed in a substantially similar manner as described above referring to S10 of FIG. 12 and FIG. 14, and description thereof is omitted.

As described above, according to the variation of the first embodiment, the user A can visually check an image to be captured, even when a target object is away from the smart phone 3, before instructing the spherical image capturing device 1 to transmit the wide-angle view image data to the smart phone 3. For example, assuming that the user A, who is having a party on board, wants to capture an image, the user A may ask another person to capture an image of a certain area inboard (inside) with the smart phone 3. The user A himself or herself may go outside the board (such as on deck), with the spherical image capturing device 1. Then, the user A captures an image of scenery with the spherical image capturing device 1, at a desired timing, such as when a boat approaches a bridge. Accordingly, the user A is able to instruct the spherical image capturing device 1 to capture an image of a particular object at any desired time, while checking landscape that can be captured. In response to capturing at the spherical image capturing device 1, the smart phone 3, which is placed apart, can take an image of another place (such as a room) by linked image capturing. The above-described case assumes that the user A takes the spherical image capturing device 1 on deck, but the user A may instead bring the smart phone 3 on deck, while leaving the spherical image capturing device 1 inboard. In such case, it is more desirable for the user A to capture an image of a particular object on deck, as the narrow-angle view image data, rather than scenery of surroundings. For example, the user A may take an image reflecting scene that caught his or her mind, with the smart phone 3.

Second Embodiment

Referring now to FIGS. 18 to 22, an image communication system is described according to a second embodiment.

Schematic Configuration of Image Communication System

Figure 18:
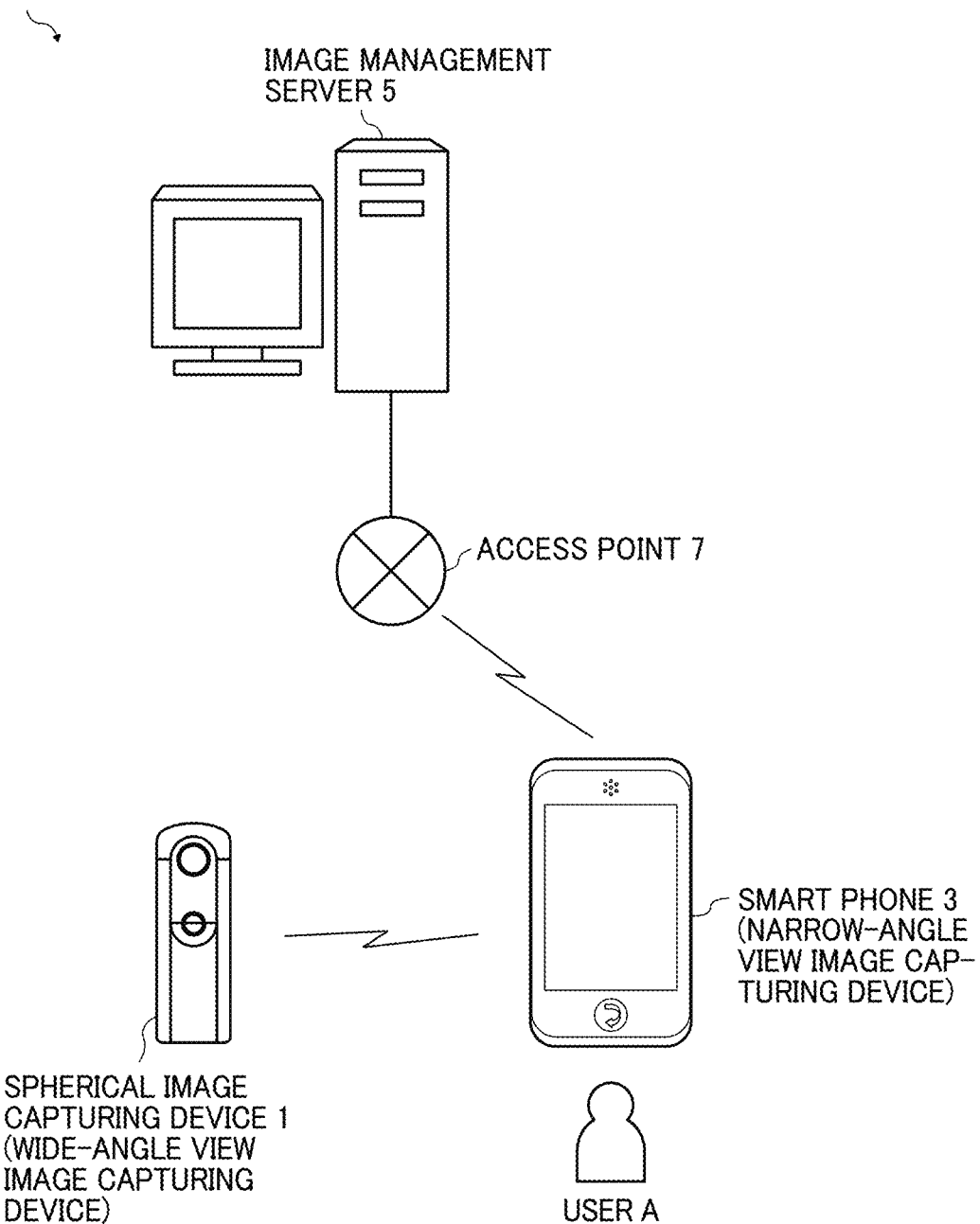
FIG. 18 is a schematic diagram illustrating a configuration of an image communication system according to a second embodiment.

First, referring to FIG. 18, an overview of the image communication system is described according to the second embodiment. FIG. 18 is a schematic diagram illustrating a configuration of the image communication system according to the second embodiment. In the second embodiment, the image communication system of FIG. 18 is further provided with an image management server 5 and an access point 7, compared to the system configuration illustrated in FIG. 8.

In the first embodiment, the smart phone 3 communicates data with the spherical image capturing device 1 by Wi-Fi. In the second embodiment, an access point 7 is additionally provided to intermediate data between the smart phone 3 and the image management server 5. The smart phone 3 enables communication of data with the image management server 5 by switching a counterpart of communication from the spherical image capturing device 1 to the access point 7. Accordingly, the image management server 5 is able to communicate data with the smart phone 3 via the access point 7. The image management server 5 may be implemented by a computer. The image management server 5 may be implemented by a single computer or may be implemented by a plurality of computers.

Example Hardware Configuration

Figure 19:
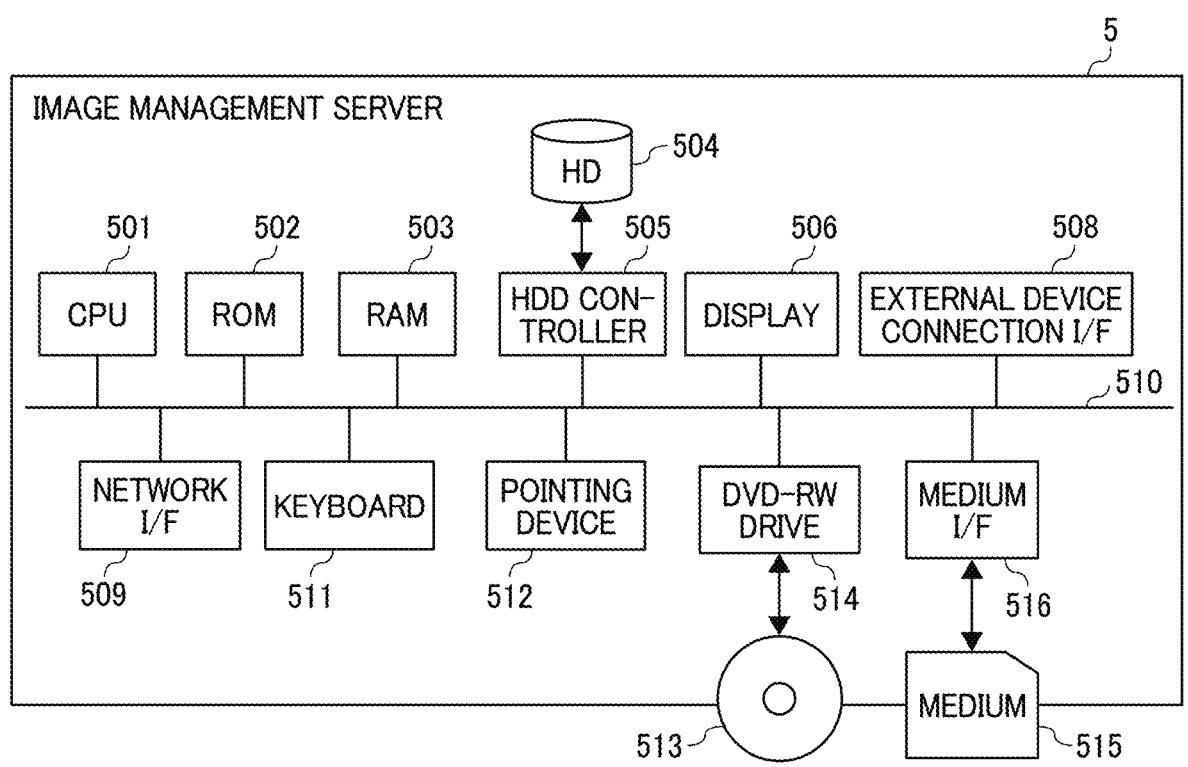
FIG. 19 is a schematic diagram illustrating a hardware configuration of an image management server according to the second embodiment.

Next, referring to FIG. 19, a hardware configuration of the image management server 5 is described according to the embodiment. Since the spherical image capturing device 1 and the smart phone 3 are substantially the same in hardware configuration as described in the first embodiment, description thereof is omitted. Since the access point 7 is a general-purpose access point, description of a hardware configuration thereof is omitted.

Hardware Configuration of Image Management Server

FIG. 19 illustrates a hardware configuration of the image management server 5 according to the embodiment. As illustrated in FIG. 19, the image management server 5, which is implemented by a computer, includes a CPU 501, a ROM 502, a RAM 503, a HD 504, a hard disk drive (HDD) controller 505, a display 506, an external device connection interface (I/F) 508, a network I/F 509, a bus line 510, a keyboard 511, a pointing device 512, a digital versatile disk rewritable (DVD-RW) drive 514, and a medium I/F 516.

The CPU 501 controls entire operation of the image management server 5. The ROM 502 stores a program for controlling the CPU 501, such as IPL. The RAM 503 is used as a work area for the CPU 501. The HD 504 stores various data such as a program. The HDD controller 505 controls reading and writing of various data from and to the HD 504 under control of the CPU 501. The display 506 displays various information such as a cursor, menu, window, characters, or image. The external device connection I/F 508 is an interface that connects the computer as the image management server 5 to various external devices. Examples of the external devices include, but not limited to, a universal serial bus (USB) memory and a printer. The network I/F 509 is an interface that controls communication of data with an external device through the communication network 100. The bus line 510 may be an address bus or a data bus, which electrically connects various elements such as the CPU 501 of FIG. 19.

The keyboard 511 is one example of input device provided with a plurality of keys for allowing a user to input characters, numerals, or various instructions. The pointing device 512 is an example of an input device that allows a user to select or execute a specific instruction, select a target for processing, or move a cursor being displayed. The DVD-RW drive 514 reads and writes various data from and to a DVD-RW 513, which is an example of a removable storage medium. In alternative to the DVD-RW, any recording medium may be used such as a DVD-R, Blu-ray Disc (Blu-ray Disc), etc. The medium I/F 516 controls reading and writing (storing) of data from and to a storage medium 515 such as a flash memory.

Example Functional Configuration

Figure 20:
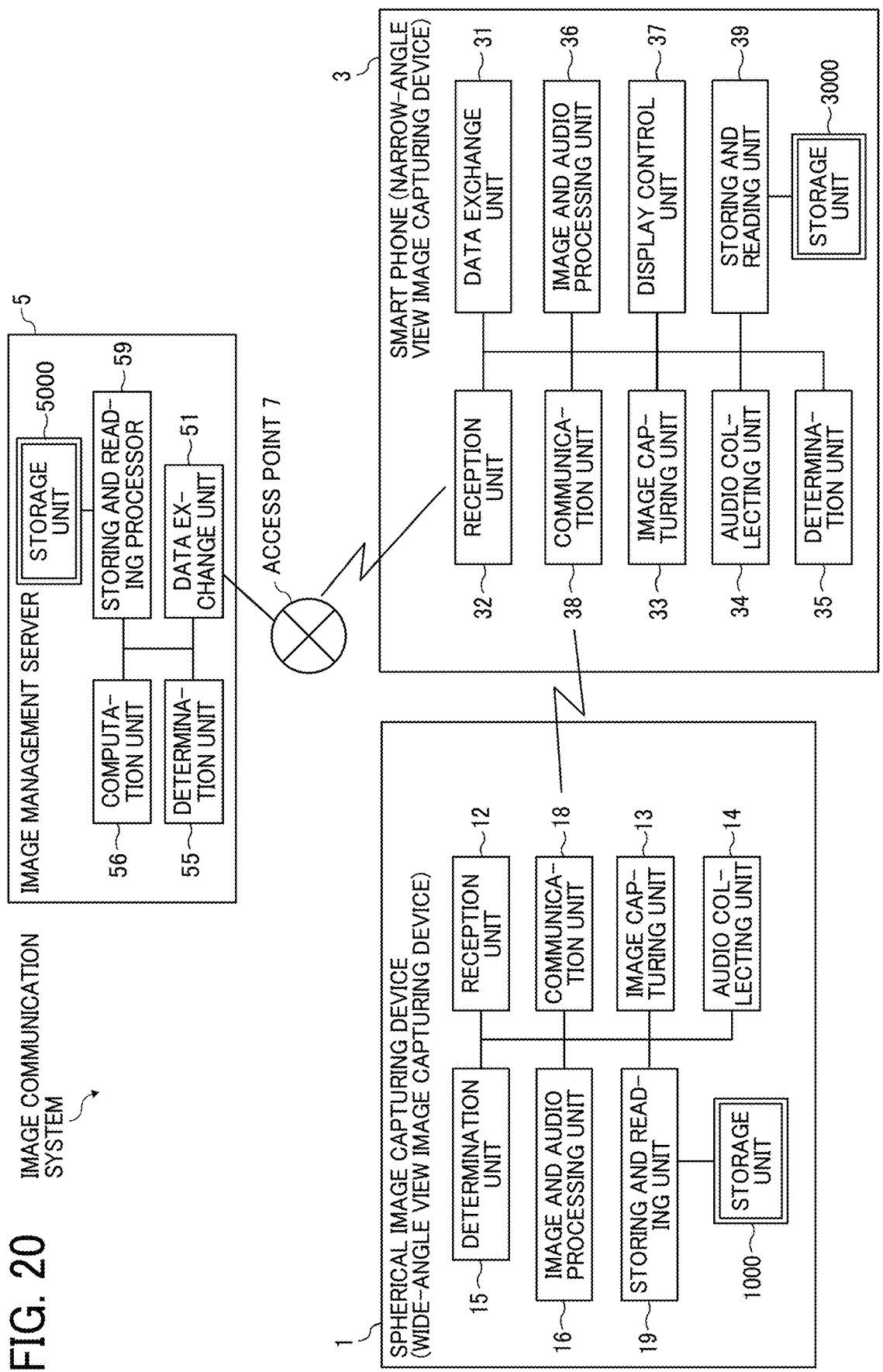
FIG. 20 is a schematic block diagram illustrating a functional configuration of the image communication system according to the second embodiment.

Referring now to FIG. 20, a functional configuration of the image communication system is described according to the embodiment. FIG. 20 is a schematic block diagram illustrating a functional configuration of the image communication system according to the second embodiment. Since the spherical image capturing device 1 and the smart phone 3 are substantially same in functional configuration as described in the first embodiment, description thereof is omitted, while using the same reference numerals for the same functional units. Since the access point 7 is a general-purpose access point, description of functional configuration thereof is omitted.

Functional Configuration of Image Management Server

Referring to FIG. 20, a functional configuration of the image management server 5 is described according to the embodiment. FIG. 20 is a schematic block diagram illustrating a functional configuration of the image communication system according to the second embodiment.

As illustrated in FIG. 20, the image management server 5 includes a data exchange unit 51, a determination unit 55, a computation unit 56, and a storing and reading unit 59. These units are functions that are implemented by or that are caused to function by operating any of the elements illustrated in FIG. 19 in cooperation with the instructions of the CPU 111 according to the image capturing device control program deployed from the HD 504 to the RAM 503.

The image management server 5 further includes a storage unit 5000, implemented by the ROM 502 and the HD 504 illustrated in FIG. 19.

Functional Configuration of Image Communication System

Still referring to FIGS. 19 and 20, each functional unit of the image management server 5 is described according to the embodiment.

The data exchange unit 51 of the image management server 5, which is implemented by instructions of the CPU 501 to the network I/F 510, transmits or receives various data or information to or from other device (for example, the smart phone 3) through a communication network such as the Internet.

The determination unit 55, which is implemented by instructions of the CPU 501, performs various determinations.

The computation unit 56, which is implemented by instructions of the CPU 501, performs various calculations.

The storing and reading unit 59, which is implemented by instructions of the CPU 501, stores various data or information in the storage unit 5000 or reads out various data or information from the storage unit 5000.

Example Operation

Figure 21:
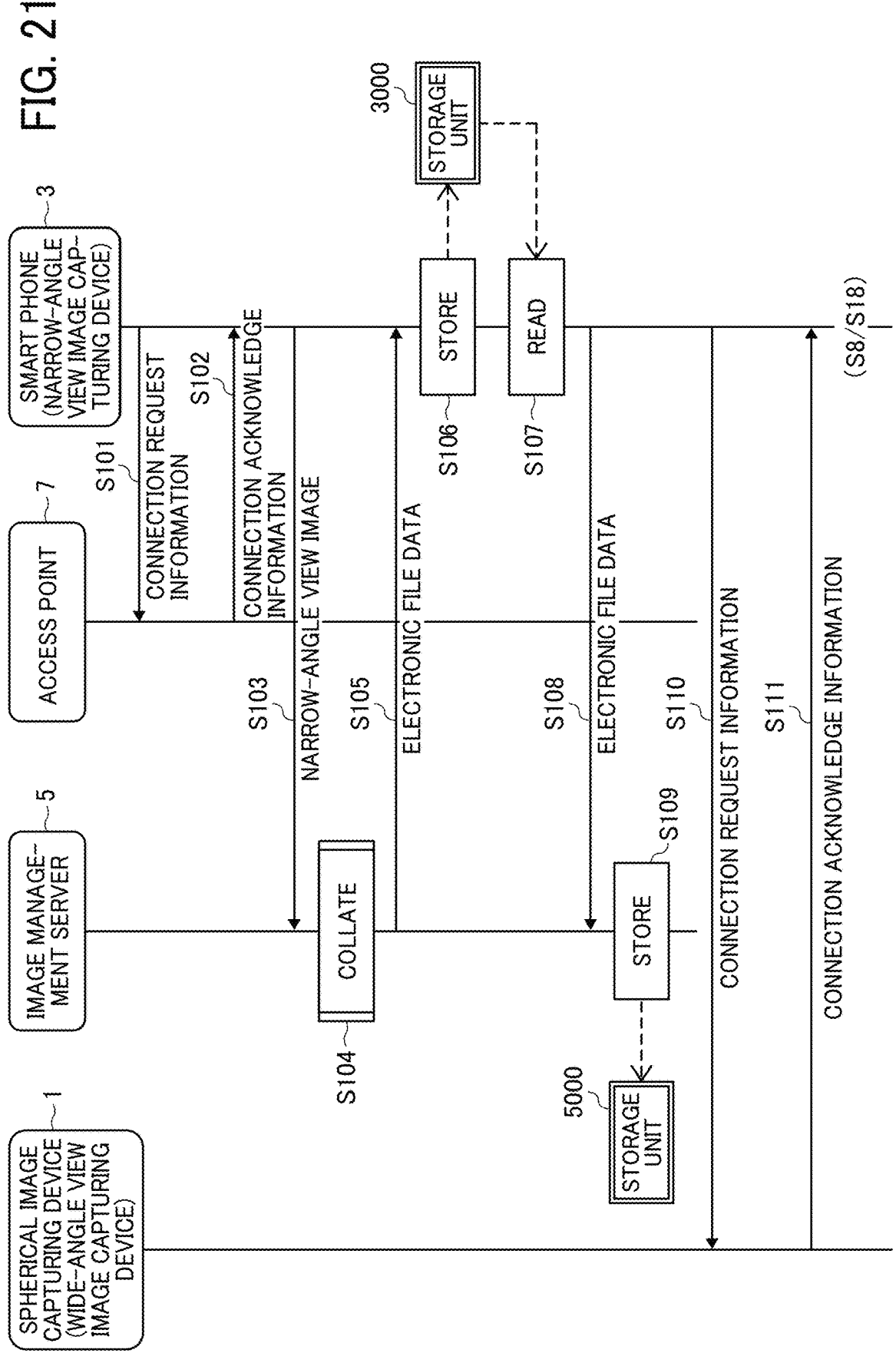
FIG. 21 is a sequence diagram illustrating operation of processing communication of electronic file data, according to the second embodiment.

The processing or operation of the second embodiment will be described with reference to FIG. 21. FIG. 21 is a sequence diagram illustrating processing to communicate electronic file data according to the second embodiment. In the second embodiment, it is assumed that the processing of FIG. 21 is performed between S9 of FIG. 12 (or S17 of FIG. 17) and S10 of FIG. 12 (or S18 of FIG. 17) of the first embodiment.

First, after the process of S9 (or S17), the communication unit 38 of the smart phone 3 transmits connection request information indicating a connection request to the access point 7 (S101). Accordingly, the access point 7 receives the connection request information.

Next, the access point 7 transmits connection acknowledge information indicating that the connection request is acknowledged to the smart phone 3 (S102). The communication unit 38 of the smart phone 3 receives the connection acknowledge information. Through processing of S101 and S102, a destination of the Wi-Fi connection of the smart phone 3 (that is, a communication counterpart) is switched from the spherical image capturing device 1 to the access point 7.

Next, the communication unit 38 of the smart phone 3 transmits the narrow-angle view image data acquired at S2 (or S15) to the image management server 5 via the access point 7 (S103).

Accordingly, the data exchange unit 51 of the image management server 5 receives the narrow-angle view image data.

Next, the image management server 5 performs collation processing on the narrow-angle view image data (S104). Referring to FIG. 22, collation processing is described in detail. FIG. 22 is a flowchart illustrating collation processing performed on the narrow-angle view image data, according to the embodiment.

As illustrated in FIG. 22, the determination unit 55 of the image management server 5 determines whether or not any electronic file stored in the storage unit 5000 is to be collated (S131). When it is determined that there is any electronic file to be collated exists (S131: YES), the storing and reading unit 59 reads out the narrow-angle view image data, from the electronic file (S132).

Next, the computation unit 56 compares the narrow-angle view image data received at S103 obtained through image capturing, with the narrow-angle view image data read at S132, to calculate the Hamming distance (S133). There are various methods for calculating the Hamming distance. In this disclosure, according to the well-known method, average Hash is used as a feature value of the narrow-angle view image data received at S103, and the computation unit 56 obtains a 64 bit feature value (hash value) as follows.

(1) The narrow-angle view image data is converted to grayscale image data.

(2) The grayscale image data is reduced in data size so that the grayscale image data has 64 (8×8) pixels.

(3) The average value is obtained for each pixel of the grayscale image data.

(4) The 64 bit feature value (hash value) is obtained for each pixel of the grayscale image data. Specifically, the value of pixel is set to 1 if the pixel has a value equal to or greater than the average value obtained at (3). The value of pixel is set to 0 if the pixel has a value less than the average value obtained at (3).

(5) Hamming distance of the hash value obtained at (4) is calculated, between the narrow-angle view image data received at S103 and the narrow-angle view image data read at S132 for collation.

Next, the determination unit 55 compares a distance L1 calculated at S133 with the minimum distance L0 obtained from the previous collation processing, and determines whether or not the distance L1 is less than the minimum distance L0 (S134). When the distance L1 is less than the minimum distance L0 (S134: YES), the storing and reading unit 59 updates the calculated distance L1 as the minimum distance, and temporarily stores the distance L1 in the storage unit 3000 in association with a file name of the narrow-angle view image data that is read at S132 (S135). The operation then returns to S131. When it is determined that the distance L1 is not less than the minimum distance L0 at S134 (S134: NO), the operation returns to S131.

On the other hand, when there is no electronic file to be collated is stored in the storage unit 5000 at S131 (S131: NO), the storing and reading unit 59 reads out the electronic file data having the file name that is temporarily stored at S135 (S136).

Through processing of FIG. 22, the narrow-angle view image data, which is collated with the narrow-angle view image data obtained at S103, is obtained.

The operation of S104 of FIG. 21 ends.

Subsequently, the data exchange unit 51 of the image management server 5 transmits the electronic file data read at S136 to the smart phone 3 via the access point 7 (S105). Accordingly, the communication unit 38 of the smart phone 3 receives the electronic file data.

Next, the storing and reading unit 39 of the smart phone 3 stores the electronic file data received at S105 in the storage unit 3000 (S106).

Next, the storing and reading unit 39 of the smart phone 3 reads out the electronic file data stored at S9 of FIG. 12 (S107). The communication unit 38 transmits the electronic file data read at S107 to the image management server 5 via the access point 7 (S108). Accordingly, the data exchange unit 51 of the image management server 5 receives the electronic file data.

Next, the storing and reading unit 59 of the image management server 5 stores the electronic file data received at S108 in the storage unit 5000 (S109). Through processing of S107 and S108, the electronic file data managed by the image management server 5 is kept up to date.

Next, the communication unit 38 of the smart phone 3 transmits connection request information indicating a connection request to the spherical image capturing device 1 (S110). Accordingly, the data exchange unit 11 of the spherical image capturing device 1 receives the connection request information.

Next, the spherical image capturing device 1 transmits connection acknowledge information indicating that the connection request is acknowledged to the smart phone 3 (S111). The communication unit 38 of the smart phone 3 receives the connection acknowledge information. Through processing of S110 and S111, a destination of the Wi-Fi connection is changed from the access point 7 back to the spherical image capturing device 1, such that the smart phone 3 can immediately execute linked image capturing processing as requested by the user A.

As described above, according to the present embodiment, in addition to the advantage that can be achieved by the first embodiment, the following advantage can be achieved. One or more items of electronic file data can be stored in the image management server 5, such that a storage area of the storage unit 3000 of the smart phone 3 is not so much affected, even when a size of image data is large or a number of items of image data increases. Further, through processing to collate, electronic file data items of the same target object can be associated with each other.

Variation

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

For example, any one of the above-described embodiments may be performed in various other ways.

The displaying processing of S10 of FIG. 12 (or S18 of FIG. 17) in the first (or second) embodiment may be repeated twice with different electronic files when executing processing of FIG. 14. For example, the display control unit 37 may display images based on a first electronic file and a second electronic file that are different from each other. In one example, the first electronic file and the second electronic file are respectively the electronic file data stored at S9 of FIG. 12 (or S17 of FIG. 17) and the electronic file data stored at S106 of FIG. 21. Accordingly, after displaying an image of the electronic file data that is obtained most recently, the display control unit 36 can display on the display 318 an image of the electronic file data that is similar to the most recent electronic file data, which has been previously obtained (that is, the electronic file data that are collated). This may recall the user's memories more effectively, allowing the user to remember the scene of the photographed image.

Further, at S104 of FIG. 21, the image management server 5 may collate the location information of the captured image data. In such case, the smart phone 3 acquires the location information using the GPS receiver 311 at the time of capturing images at S2 (or S15). The location information includes a latitude and a longitude of a location where the image is captured. Accordingly, at S9 (or S17), the storing and reading unit 39 embeds the location information in the narrow-angle view image data, and stores the narrow-angle view image embedded with the location information. The electronic file may be generated in Exchangeable Image File format (Exif). In this case, at S103 of FIG. 21, the communication unit 38 transmits the location information in addition to the narrow-angle view image data. Further, at S132 of FIG. 22, the storing and reading unit 59 reads out the location information in addition to the narrow-angle view image data. Then, at S133, the computation unit 46 calculates the Euclidean distance, using the coordinates (latitude and longitude of a place where the image is captured) indicated by the location information. By displaying an image previously taken at the same place or near that place, the user may easily recall memories related to the image being displayed. The location information may be acquired by a GPS receiver, which may be provided in the spherical image capturing device 1.

Further, in the second embodiment, the communication unit 38 communicates with the image management server 5 via the access point 7. Alternatively, the data exchange unit 31 may communicate with the image management server 5 via a communication network such as the Internet.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), System on Chip (SOC), and graphical processing unit (GPU), and conventional circuit components arranged to perform the recited functions.

Examples of communication network such as the Internet may also include a network implemented by blockchain.

In the first embodiment, as illustrated in FIG. 8, the image communication system includes the spherical image capturing device 1 and the smart phone 3, but the image communication system may be implemented in various other ways.

For example, the image communication system may include any apparatus installed with a program that causes the apparatus to additionally have a function of the display control unit 37 and a function of the communication unit 38 as described above, and the spherical image capturing device 1. As described above, one example of such apparatus is a wide-angle view image capturing device, which may be implemented by the smart phone, PC, smart watch, display, game machine, car navigation system, and wearable terminal, or any apparatus capable of capturing a wide-angle view image and displaying images. Other examples of such apparatus is any apparatus capable of displaying images, but does not have to be provided with image capturing function. For instance, such apparatus may be implemented by a PC, which obtains the narrow-angle view image and the wide-angle view image, which have been associated with each other, and sequentially displays the narrow-angle view image and a predetermined-area image of the wide-angle view image.

Specifically, in one example, an apparatus for controlling display of an image is provided, which includes circuitry to: obtain a first image and a second image, the second image having an angle of view wider than that of the first image, the second image having been captured by a second image capturing device different from a first image capturing device that has captured the first image; and control a display to sequentially display the first image and the second image.

In this disclosure, the smart phone is an example of a narrow-angle view image capturing device, which is an example of a first image capturing device. The spherical image capturing device 1 is an example of a wide-angle view image capturing device, which is an example of a second image capturing device.

The waiting time at S5 of FIG. 12 may be set in the smart phone 3 by the user. For example, if the waiting time is set to 0 second, no waiting time occurs, and the smart phone 3 and the spherical image capturing device 1 capture images at the same time, or substantially at the same time. Similarly, the waiting time at S13 of FIG. 17 may be set directly on the spherical image capturing device 1 by the user, or may be indirectly set by the user from the smart phone 3 using Bluetooth or the like.

Further, at any one of S6 and S8 of FIG. 12, and S14 and S16 of FIG. 17, only one of Bluetooth and Wi-Fi may be used.

Further, when the storing and reading unit 39 stores the electronic file data at S9 of FIG. 12, the display control unit 37 may control the display 318 to display a user interface for receiving a file name, without proceeding to S10. In this case, the smart phone 3 may later perform the display processing of S10 by reading out the desired electronic file data according to operation of the user A. For example, the user A may designate desired electronic file data with a file name. Accordingly, the user A is able to check the displayed contents, not only at the time of image capturing but also at any time desired by the user.

Further, as illustrated in FIGS. 16A to 16C, the display control unit 37 switches the display from the narrow-angle view image to the predetermined-area image, after the waiting time t1, but this disclosure is not limited to this example. For example, the display control unit 37 may continue to display the narrow-angle view image until the smart phone 3 receives an operation input of the user A, such as a touch on the smart phone 3. In response to the operation input of the user A, the display control unit 37 displays the predetermined-area image while changing a predetermined area, at least for a time period during when the operation input, such as touch, by the user A continues (while the touched state remains). When the operation input of the user A is no longer received, the display control unit 37 may display the wide-angle view image again. According to this displaying method, display of the narrow-angle view image and the wide-angle view image can be switched at a timing desired by the user A.

Further, as illustrated in FIGS. 16A to 16C, the display control unit 37 displays the predetermined-area image Q11 in the wide-angle view image, after displaying the narrow-angle view image, but this disclosure is not limited to this example. For example, the display control unit 37 firstly displays the predetermined-area image Q11, throughout the entire predetermined area T in the equirectangular projection image EC1 as the wide-angle view image, and then displays the planar image P as the narrow-angle view image. That is, an order of displaying the respective images may be changed.

For example, as a first display pattern, the display control unit 37 performs a series of displaying the narrow-angle view image and displaying a predetermined-area image of the wide-angle view image.

In another example, as a second display pattern, the display control unit 37 repeats the series of displaying the narrow-angle view image and displaying a predetermined-area image of the wide-angle view image.

In another example, as a third display pattern, the display control unit 37 performs a series of displaying the narrow-angle view image, displaying a predetermined-area image of the wide-angle view image, and again displaying the narrow-angle view image. This display pattern may help a person who has taken this image recall feelings at that time with his or her facial expression.

Further, the display control unit 37 may control the display 318 to display a screen for selecting one of the above-described display patterns and prompt the user A to select the display pattern. In this case, the reception unit 32 receives the selection of the user A, and the display control unit 37 displays the selected display pattern.

Further, before and/or after the processing of S10 (or S18), the display control unit 37 may convert the captured image to have a little planet format for display. Since the entire spherical image can be displayed in the little planet format, the user A is able to check the entire image including an area outside the predetermined area T at the end.

Further, in order for the user A to use the smart phone 3 in cooperation with the spherical image capturing device 1, it is necessary to install software application for causing the smart phone 3 to execute the setting for establishing a wireless communication connection with the spherical image capturing device 1 by Wi-Fi or BLUETOOTH, and the processing of FIG. 12, FIG. 17, or FIG. 21. In order to reduce the work by the user that is needed, the following processing can be performed.

Specifically, the storage unit 1000 of the spherical image capturing device 1 stores in advance dedicated software for causing the smart phone 3 to configure a wireless communication connection and implementing the processing of FIG. 12, FIG. 17, or FIG. 21. The spherical image capturing device 1 and the smart phone 3 are connected by a wired cable such as a USB cable. The smart phone 3 accesses the storage unit 1000 of the spherical image capturing device 1 to acquire the dedicated software.

Moreover, at S8 and S16, the spherical image capturing device 1 directly transmits the wide-angle view image data to the smart phone 3. Alternatively, in a modified example, the storing and reading unit 19 of the spherical image capturing device 1 may store the wide-angle view image data in the storage unit 1000, before transmission of the wide-angle view image data.

Further, at the time of storing the electronic file data (S9, S17) in the first embodiment and the variation of the first embodiment, the smart phone 3 may upload the same electronic file data to the image management server 5 of the second embodiment, to keep backup data in the image management server 5.

As described above in one or more embodiments, the present invention may reside in an apparatus, system, and method of display control, and a control program.

In one or more embodiments, the apparatus is installed with a control program, which causes the apparatus to obtain a first image, and a second image having an angle of view wider than that of the first image, and controls a display to sequentially display the first image and the second image.

In one example, the apparatus is an image capturing device for displaying the first image, which is a narrow-angle view image having been captured. The image capturing device includes: a communication unit configured to obtain data of a second image from another image capturing device, the second image having an angle of view wider than that of the first image; and a display control unit configured to sequentially display, on a display, the first image and the second image.

For example, the display control unit displays a viewable-area image, which is an image of a viewable area of the second image, according to a display range of the second image to be displayed.

For example, the display control unit moves the display range of the second image to display different viewable areas of the second image.

In particular, in one example, the display control unit moves the display range of the second image throughout entire second image to display all different viewable areas of the second image.

The display range can be ranged, for example, between 0 and 360 degrees of pan angle of imaging direction.

The first image and the second image may be displayed in various ways.

In one example, the second image, such as the viewable-area image, is displayed after displaying the first image.

In another example, the second image, such as the viewable-area image, is displayed after displaying the first image for a predetermined time period.

In another example, the first image is displayed after displaying the second image, such as the viewable-area image.

For example, the image capturing device includes a reception unit that receives a request for starting image capturing to obtain the first image, and a communication unit that instructs the another image capturing device to start image capturing to obtain the second image in response to the request.

In another example, the another image capturing device includes a reception unit that receives a request for starting image capturing to obtain the second image, and a communication unit that instructs the image capturing device to start image capturing to obtain the first image in response to the request.

For example, the present invention may reside in an image communication system including the above-described image capturing device and the another image capturing device.

For example, the image communication may further include an image management server that stores at least one electronic file in which the first image and the second image are associated. The image capturing device obtains data of the electronic file from the image management server.

For example, the present invention may reside in a method for controlling display of an image. The method includes obtaining a first image and a second image, the second image having an angle of view wider than that of the first image, the second image having been captured by a second image capturing device different from a first image capturing device that has captured the first image; and sequentially displaying the first image and the second image.

For example, the present invention may reside in a display control program that causes a computer system to carry out the display control method.

The invention claimed is:

1. An image capturing device comprising:
an imager to capture a first image; and
circuitry configured to
receive a second image from another image capturer, the second image having an angle of view wider than that of the first image, and
control a display to display the first image and the second image,
wherein the circuitry controls the display to display, after displaying one of the first image and the second image for a predetermined amount of time, the other one of the first image and the second image,
and the displaying the second image comprises:
displaying, on the display, an image of an area of the second image, according to a display range of the second image, and
moving continuously the display range of the second image throughout the entire second image to display different areas of the second image.

2. The image capturing device of claim 1, wherein the display range is moved so as to change an imaging direction with respect to the second image.

3. The image capturing device of claim 1, wherein the circuitry controls the display to display the image of the area of the second image, after displaying the first image.

4. The image capturing device of claim 3, wherein the first image is displayed for a predetermined time period.

5. The image capturing device of claim 1, wherein the circuitry controls the display to display the first image, after displaying the image of the area of the second image.

6. The image capturing device of claim 1, wherein the circuitry is configured to:
receive, from a user, a request for starting image capturing to obtain the first image; and
instruct the another image capturing device to start image capturing to obtain the second image in response to the request.

7. The image capturing device of claim 6, wherein the circuitry controls transmission of the instruction to the another image capturing device, and display of the first image and the second image, according to a control program.

8. An image communication system comprising:
the image capturing device of claim 1; and
the another image capturing device comprising another circuitry configured to:
receive, from a user, a request for starting image capturing to obtain the second image; and
instruct the image capturing device to start image capturing to obtain the first image.

9. The image communication system of claim 8, further comprising:
an image management server comprising a memory that stores at least one electronic file in which the first image and the second image are associated,
wherein the image capturing device obtains the first image and the second image from the image management server.

10. The image capturing device of claim 1, wherein the display setting information further includes a displayable range of the second image and a total display time of the second image.

11. The image capturing device of claim 1, wherein the circuitry is further configured to:
obtain display setting information including a display time of the first image, and
control the display to sequentially display the first image and the second image according to the display setting information.

12. A method for controlling display of an image, comprising:
obtaining a first image and a second image, the second image having an angle of view wider than that of the first image, the second image having been captured by a second image capturing device different from a first image capturing device that has captured the first image; and controlling a display to display, after displaying one of the first image and the second image for a predetermined amount of time, the other one of the first image and the second image, and the displaying the second image comprises:

displaying an image of an area of the second image on the display according to a display range of the second image, and moving continuously the display range of the second image throughout the entire second image to display different areas of the second image.

13. The method for controlling display of an image of claim 12, wherein the display setting information further includes a displayable range of the second image and a total display time of the second image.

14. A non-transitory recording medium storing a plurality of instructions which, when executed by one or more processors, cause the processors to perform a method for controlling display of an image, the method comprising:

obtaining a first image and a second image, the second image having an angle of view wider than that of the first image, the second image having been captured by a second image capturing device different from a first image capturing device that has captured the first image; and controlling a display to display, after displaying one of the first image and the second image for a predetermined amount of time, the other one of the first image and the second image, and the displaying the second image comprises:

displaying an image of an area of the second image on the display according to a display range of the second image, and moving continuously the display range of the second image throughout the entire second image to display different areas of the second image.

15. The non-transitory recording medium of claim 14, wherein the display setting information further includes a displayable range of the second image and a total display time of the second image.

* * * * *